United States Patent
Han et al.

(10) Patent No.: US 12,494,034 B2
(45) Date of Patent: Dec. 9, 2025

(54) METHOD AND APPARATUS FOR OBTAINING INFORMATION ABOUT OBJECT USING PLURALITY OF SENSORS

(71) Applicant: AVIKUS CO., LTD., Seoul (KR)

(72) Inventors: Dae Yong Han, Seoul (KR); Joontae Hwang, Seoul (KR)

(73) Assignee: AVIKUS CO., LTD., Seoul (KR)

( * ) Notice: Subject to any disclaimer, the term of this patent is extended or adjusted under 35 U.S.C. 154(b) by 0 days.

(21) Appl. No.: 18/963,674

(22) Filed: Nov. 28, 2024

(65) Prior Publication Data

US 2025/0095325 A1   Mar. 20, 2025

Related U.S. Application Data

(63) Continuation of application No. PCT/KR2023/022038, filed on Dec. 29, 2023.

(30) Foreign Application Priority Data

Dec. 30, 2022 (KR) .................. 10-2022-0190733

(51) Int. Cl.
  *G06K 9/00* (2022.01)
  *G06T 17/00* (2006.01)
  (Continued)

(52) U.S. Cl.
  CPC .............. *G06V 10/40* (2022.01); *G06T 17/00* (2013.01); *G06V 10/774* (2022.01)

(58) Field of Classification Search
  CPC ....... G06V 10/40; G06V 10/774; G06T 17/00
  See application file for complete search history.

(56) References Cited

U.S. PATENT DOCUMENTS 10,824,862 B2 * 11/2020 Qi ........................ G06F 18/2414
11,699,007 B2    7/2023 Son
(Continued)

FOREIGN PATENT DOCUMENTS

CN   114332158 A   4/2022
EP   3770882 A1   1/2021
(Continued)

OTHER PUBLICATIONS

A ToF-camera as a 3D Vision Sensor for Autonomous Mobile Robotics, Sobers Lourdu Xavier Francis et al., International Journal of Advanced Robotic Systems, 2015, pp. 1-15 (Year: 2015).*

(Continued)

*Primary Examiner* — Jayesh A Patel
(74) *Attorney, Agent, or Firm* — Harvest IP Law, LLP

(57) ABSTRACT

A navigation assistance system using a plurality of sensors according to an aspect of the present disclosure includes a display configured to provide a monitoring image, a sensor unit including at least one sensor, a memory in which at least one program is stored, and at least one processor configured to execute the at least one program, wherein the at least one processor obtains image frame information of an object using a first sensor, calculates information about the object using a second sensor, calculates a risk of collision between a host ship and the object by fusing the image frame information of the object and the information about the object, and determines an avoidance path based on the calculated collision risk.

16 Claims, 14 Drawing Sheets

(51) Int. Cl.
*G06V 10/40* (2022.01)
*G06V 10/774* (2022.01)

(56) References Cited

U.S. PATENT DOCUMENTS

| | | | | |
|---|---|---|---|---|
| 2007/0053551 | A1* | 3/2007 | Kubo | G06T 7/269 |
| | | | | 382/106 |
| 2014/0160165 | A1* | 6/2014 | Kim | G01C 21/005 |
| | | | | 345/633 |
| 2018/0190129 | A1 | 7/2018 | Park | |
| 2020/0082180 | A1* | 3/2020 | Wang | G06V 20/647 |
| 2021/0004566 | A1* | 1/2021 | Qi | G06V 10/82 |
| 2021/0181351 | A1* | 6/2021 | Ge | G01S 17/89 |
| 2021/0304491 | A1* | 9/2021 | Caccin | G06T 7/55 |
| 2021/0397855 | A1* | 12/2021 | Guizilini | G06V 10/751 |
| 2022/0027675 | A1* | 1/2022 | Sheu | G01S 17/931 |
| 2023/0029900 | A1* | 2/2023 | Goel | G06V 20/647 |

FOREIGN PATENT DOCUMENTS

| | | | |
|---|---|---|---|
| JP | H10288663 | A | 10/1998 |
| JP | 2003194551 | A | 7/2003 |
| JP | 2005353032 | A | 12/2005 |
| JP | 2009229824 | A | 10/2009 |
| JP | 5369268 | B1 | 12/2013 |
| JP | 2016055772 | A | 4/2016 |
| JP | 2018049639 | A | 3/2018 |
| JP | 2021144149 | A | 9/2021 |
| KR | 20120065045 | A | 6/2012 |
| KR | 101275277 | B1 | 6/2013 |
| KR | 101298925 | B1 | 8/2013 |
| KR | 20140007614 | A | 1/2014 |
| KR | 101693982 | B1 | 1/2017 |
| KR | 101850866 | B1 | 4/2018 |
| KR | 20180046053 | A | 5/2018 |
| KR | 20180065411 | A | 6/2018 |
| KR | 101920707 | B1 | 11/2018 |
| KR | 101976403 | B1 | 8/2019 |
| KR | 20200027871 | A | 3/2020 |
| KR | 102099699 | B1 | 4/2020 |
| KR | 20210044672 | A | 4/2021 |
| KR | 1020210044672 | A * | 4/2021 |
| KR | 102251720 | B1 | 5/2021 |
| KR | 20210063841 | A | 6/2021 |
| KR | 102276678 | B1 | 7/2021 |
| KR | 102408225 | B1 | 6/2022 |
| KR | 10-2022-0132910 | A | 10/2022 |
| KR | 20220132910 | A * | 10/2022 |
| KR | 102556079 | B1 | 7/2023 |
| KR | 102613592 | B1 | 12/2023 |

OTHER PUBLICATIONS

Unmanned Aerial Surveillance System for Hazard Collision Avoidance in Autonomous Shipping, Tor A. Johansen et al., IEEE, 2016, pp. 1056-1065 (Year: 2016).*
Review of Collision Avoidance and Path Planning Methods for Ships Utilizing Radar Remote Sensing, Agnieszka Lazarowska, MDPI, 2021, pp. 1-22 (Year: 2021).*
Autonomous collision detection and avoidance for ARAGON USV: Development and field tests, Jungwook Han et al., Wiley, Jan. 2020, pp. 987-1002 (Year: 2020).*
Detection and tracking for the awareness of surroundings of a ship based on deep learning, Won-Jae Lee et al., CDE, 2021, pp. 1407-1430 (Year: 2021).*
Obstacle Detection in Real and Synthetic Harbour Scenarios, Nicolò Faggioni et al., Springer, 2022, pp. 26-38 (Year: 2022).*
Video Processing From Electro-Optical Sensors for Object Detection and Tracking in a Maritime Environment: A Survey, Dilip K. Prasad et al., IEEE, 2017, pp. 1993-2016 (Year: 2017).*
A novel approach for assistance with anti-collision decision making based on the International Regulations for Preventing Collisions at Sea, Jinfen Zhang et al., SAGE, 2012, pp. 250-259 (Year: 2012).*
A Dynamic Obstacle Avoidance Method for Unmanned Surface Vehicle under the International Regulations for Preventing Collisions at Sea, Diju Gao et al., MDPI, Jun. 2022, pp. 1-24 (Year: 2022).*
Multi-Dimensional Underwater Point Cloud Detection Based on Deep Learning, Chia-Ming Tsai et al., MDPI, 2021, pp. 1-18 (Year: 2021).*
Real-Time detection and tracking moving vehicles for video surveillance systems using FPGA, Mohammed Abdulraheem Fadhel et al., SPC, 2018, pp. 117-121 (Year: 2019).*
Sensors and AI Techniques for Situational Awareness in Autonomous Ships: A Review, Sarang Thombre et al., IEEE, Jan. 2022, pp. 64-83 (Year: 2022).*
Office Action issued by USPTO dated Jan. 3, 2025.
Time-Varying Risk Measurement for Ship Collision Prevention.
Towards a Real Time Obstacle Detection System for Unmanned Surface Vehicles.

* cited by examiner

FIRST FRAME (510)

SECOND FRAME (520)

THIRD FRAME (530)

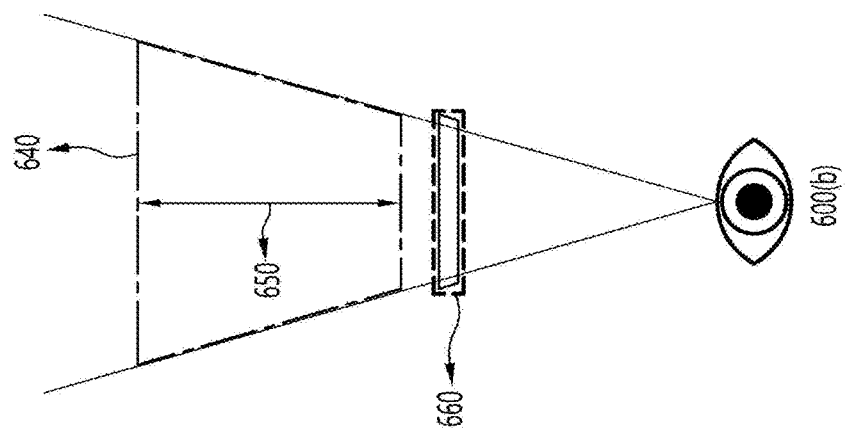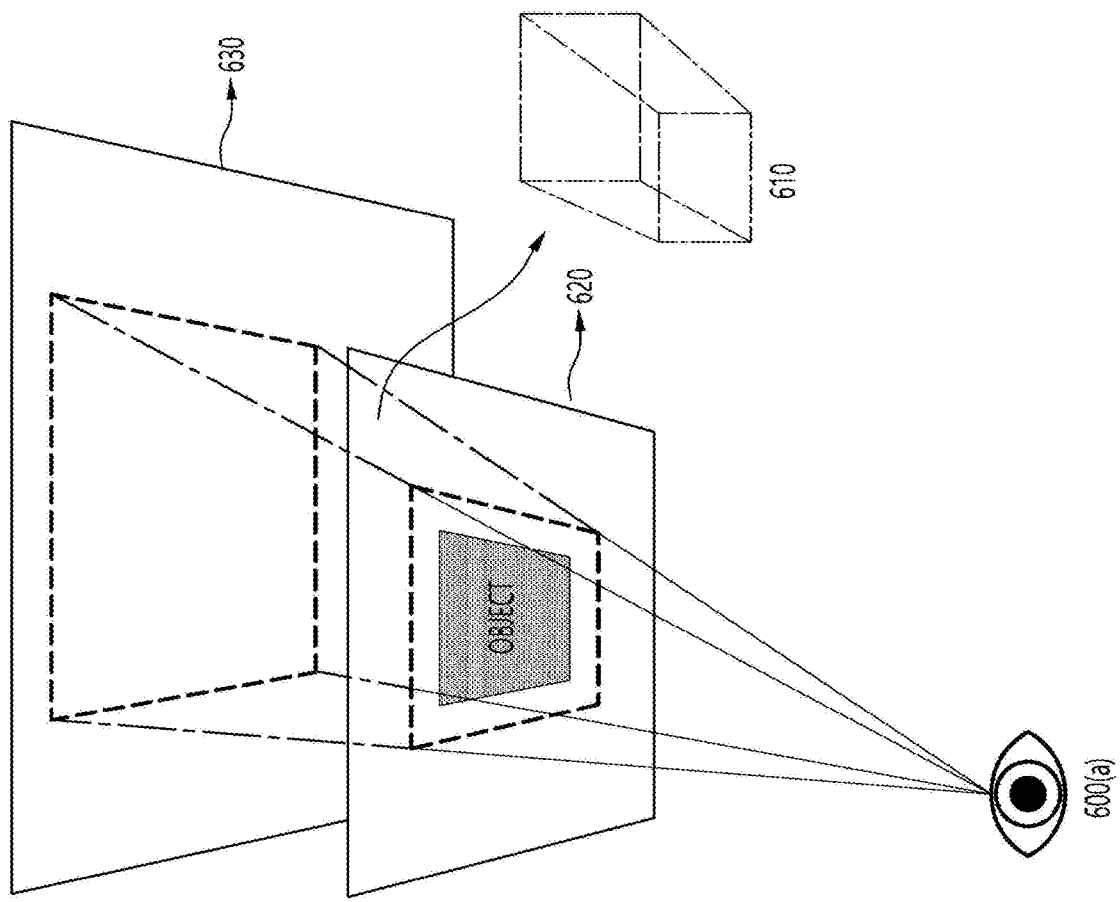

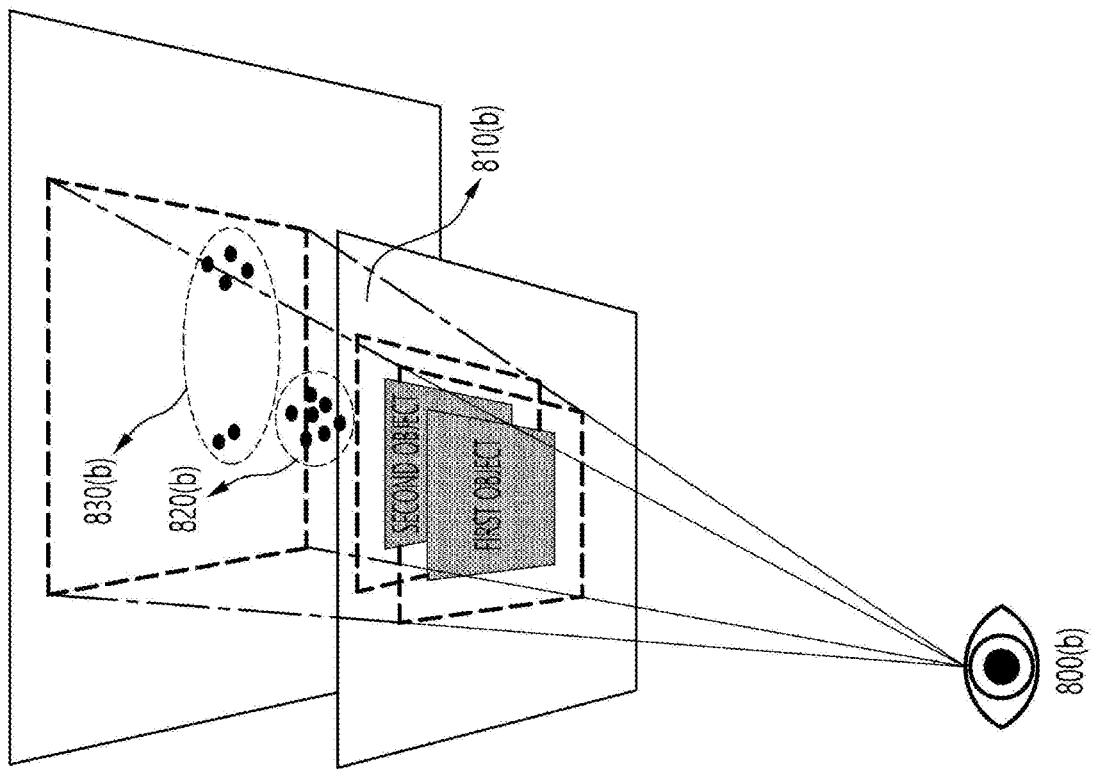
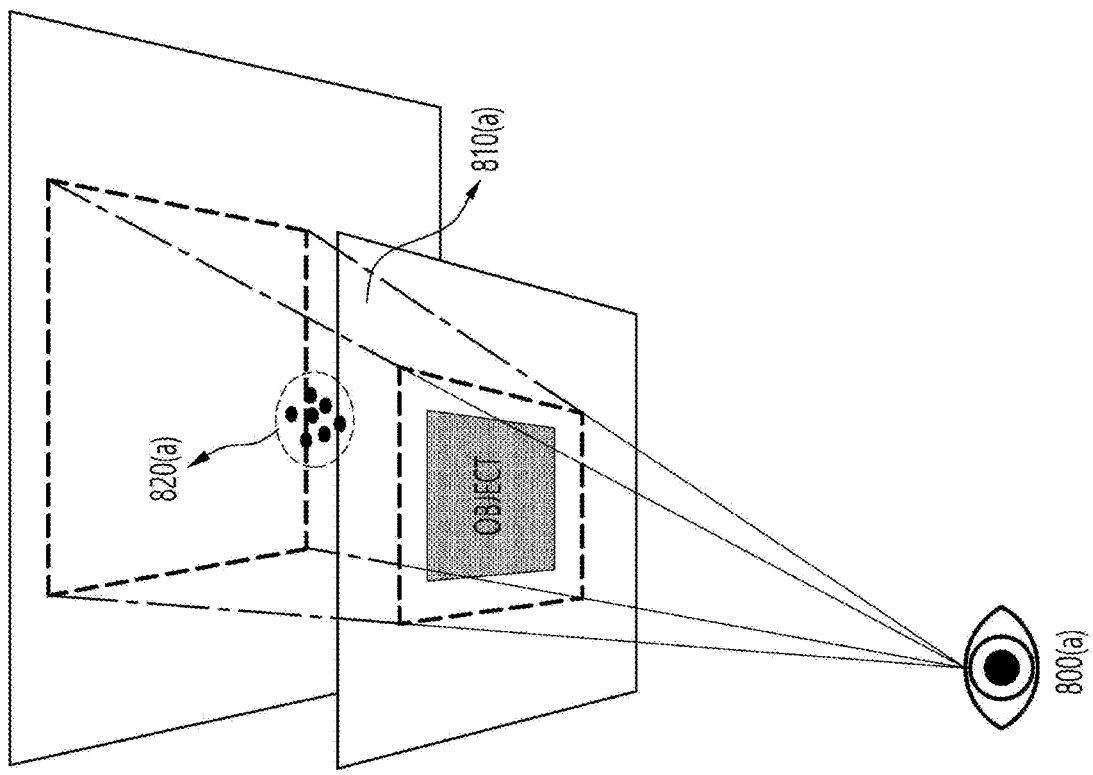

METHOD AND APPARATUS FOR OBTAINING INFORMATION ABOUT OBJECT USING PLURALITY OF SENSORS

CROSS REFERENCE TO RELATED APPLICATION(S)

This application is a continuation application of International Application No. PCT/KR2023/022038 filed on Dec. 29, 2023, which claims priority from Korea Patent Application No. 10-2022-0190733 filed on Dec. 30, 2022, the entire contents of which are incorporate herein for all purpose by this reference.

TECHNICAL FIELD

The present disclosure relates to a method and device for obtaining object information using a plurality of sensors.

BACKGROUND ART

Functions of conventional navigation assistance devices on ships are limited to simply detecting objects near ships and displaying the detected objects on a screen, serving only to only warn the navigator of potential obstacles.

However, the navigator does not constantly monitor the displayed information while operating, because the navigator is looking forward during operation. Also, the navigator is required to perform actions such as navigation planning and collision avoidance by him/herself based on the provided information. Therefore, no substantial function is provided to the navigator for navigation convenience and safe navigation.

Prior arts provide methods which enable observation of the motion of a target ship and determination whether there is a risk of collision using sensors such as a Radar device, an automatic identification system (AIS), an electronic navigational chart (ENC), and a global positioning system (GPS) device. However, not all ships are equipped with such sensors and the navigation assistance device on the ships may not be informed of which sensors are provided.

There was also a problem that in a case where not enough sensors are provided on the ship, the device may offer no functions beyond simply displaying the camera feed.

In addition, since prior arts only describe determining which vessel is the give-way vessel and generating a single avoidance route in accordance with the International Regulations for Preventing Collisions at Sea (COLREG), they do not provide a method for deriving flexible avoidance routes depending on situation. It provides only one avoidance mechanism in accordance with the COLREG.

Since it is not feasible to rely solely on the individual navigator alone for recognizing dangerous situation at sea, a plurality of sensors are used to assist in this task. However, except for some ships such as very large vessels, it is rare for all the aforementioned multiple sensors to be installed. Also, there has not been a navigation assistance device that not only determines in advance which sensors are installed but also integrates sensor data from various sensors and derives a flexible avoidance path depending on situations.

The above-described problems are provided sole to aid in understanding of this application; however, the scope of this disclosure is not limited to the solutions of the above problems.

DISCLOSURE

Technical Problem

An objective is to provide a method and device for obtaining object information using a plurality of sensors. Another objective is to provide a computer-readable recording medium having recorded thereon a program to cause the method to be executed on a computer. The objectives to be solved are not limited to those described above, and other objectives are possible.

Technical Solution

One aspect of the present disclosure may provide a method of obtaining object information using a plurality of sensors, the method including: obtaining an image frame in real time using a first sensor; forming a bounding box including at least one object within the image frame; generating an object area corresponding to the object using the bounding box; obtaining data included in the object area using a second sensor; and calculating information about the object based on the obtained data.

According to another aspect of the present disclosure, a navigation assistance system using a plurality of sensors includes: a display configured to provide a monitoring image; a sensor unit including at least one sensor; a memory in which at least one program is stored; and at least one processor configured to execute the at least one program, wherein the at least one processor obtains image frame information of an object using a first sensor, calculates information about the object using a second sensor, calculates a risk of collision between a host ship and the object by fusing the image frame information of the object and the information about the object, and determines an avoidance path based on the calculated collision risk.

According to another aspect of the present disclosure, a computer-readable recording medium includes a recording medium having recorded thereon a program to cause the above-described method to be executed on a computer.

Advantageous Effects

According to embodiments of the present invention, the type of sensors provided on the host ship may be determined in advance, objects around the host ship may be identified using the provided sensor unit, a collision risk may be predicted, an avoidance path may be derived, and the derived path may be followed.

In addition, according to an embodiment of the present disclosure, even in a case where all of the plurality of sensors required for the collision risk prediction and the path setting are not provided, the collision risk prediction and the path setting may be performed only using the provided sensors.

In addition, the image preprocessing time for obtaining object information may be reduced.

In addition, dynamic objects and static objects may be distinguished using the plurality of sensors, and information about the distinguished objects may be obtained.

The objectives of the present disclosure are not limited to the objects mentioned above, and other objectives not mentioned will be clearly understood by a person having ordinary skill in the art to which the present disclosure pertains from the following description.

DESCRIPTION OF DRAWINGS

FIGS. 6A and 6B are diagrams illustrating object areas according to an embodiment.

FIGS. 8A and 8B are diagrams illustrating examples of a method of calculating information about a specified object using an object area and data obtained using a second sensor according to an embodiment.

BEST MODE

According to an aspect of the present disclosure, a navigation assistance system using a plurality of sensors includes: a display configured to provide a monitoring image; a sensor unit including at least one sensor; a memory in which at least one program is stored; and at least one processor configured to execute the at least one program, wherein the at least one processor obtains image frame information of an object using a first sensor, calculates information about the object using a second sensor, calculates a risk of collision between a host ship and the object by fusing the image frame information of the object and the information about the object, and determines an avoidance path based on the calculated collision risk.

MODE FOR INVENTION

Terms used in describing embodiments are selected from common terms currently in widespread use as much as possible, but the meanings thereof may change according to the intention of a person having ordinary skill in the art to which the present disclosure pertains, judicial precedents, and the emergence of new technologies. In addition, in certain cases, a term which is not commonly used in the art to which the present disclosure pertains may be selected, and in such cases, the meaning of the term will be described in detail in the corresponding portion of the description of the present disclosure. Therefore, the terms used in the specification should be defined based on the meanings of the terms and the descriptions provided in the specification, rather than based on the simple names of the terms.

It will be understood that a term "comprise" or "include" used in the specification is intended to cover non-exclusive inclusions unless explicitly described to the contrary. In addition, it will be understood a term such as "unit" or "module" used in the specification refers to a unit of processing at least one function or operation, and the unit or module may be implemented as software, hardware, or a combination of software and hardware.

It will also be understood that although terms "first", "second", etc., may be used in the specification to describe various components, these components should not be limited by these terms. These terms may only be used to distinguish one component from another component.

Hereinafter, the present disclosure will be described in detail with reference to the accompanying drawings. However, the present disclosure may be realized in various forms and are not limited to examples described herein.

Figure 1:
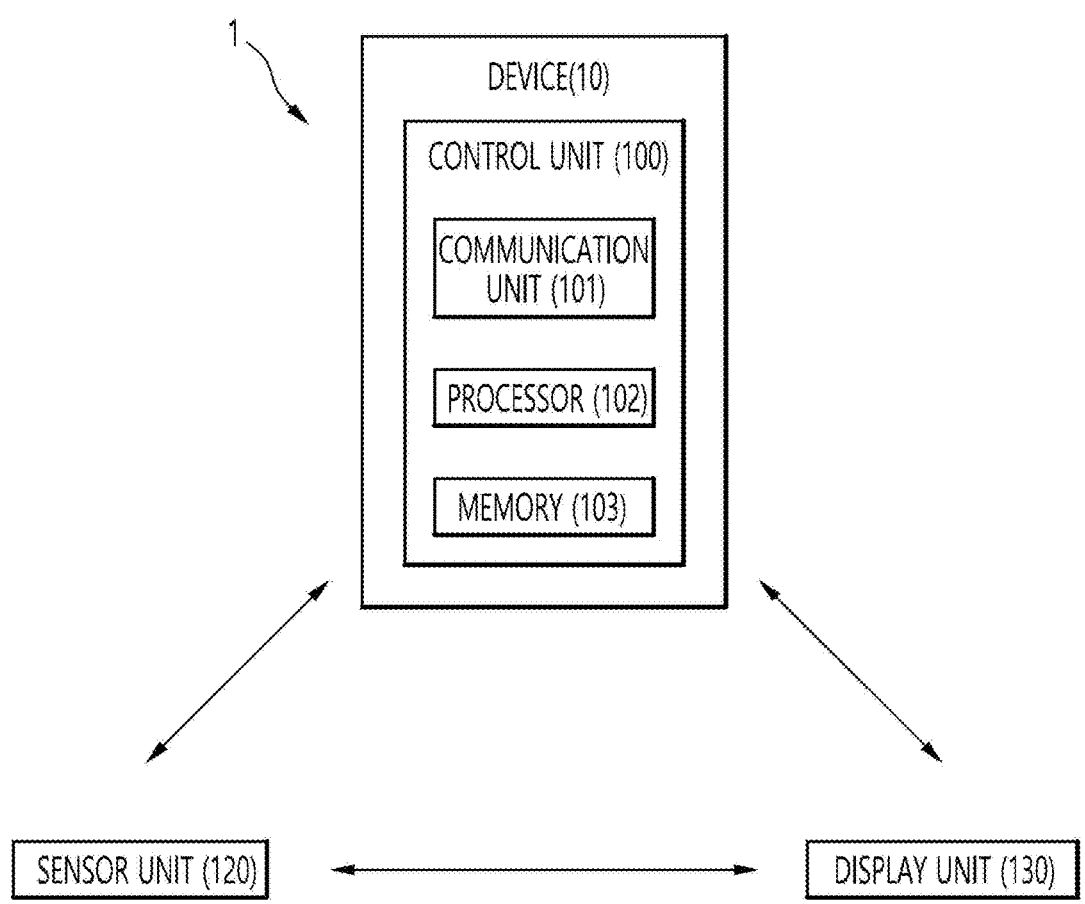
FIG. 1 is a diagram illustrating an example of a system for obtaining object information using a plurality of sensors according to an embodiment.

FIG. 1 is a diagram illustrating an example of a system for obtaining information about objects (hereinafter, referred to as "object information") using a plurality of sensors according to an embodiment.

Hereinafter, an example of the system for obtaining object information using a plurality of sensors will be described with reference to FIG. 1.

Referring to FIG. 1, a system for obtaining object information (hereinafter referred to as a system) 1 using a plurality of sensors includes a device 10, a sensor unit 120, and a display unit 130. For example, the device 10 may include a control unit 100. The control unit 100 may include a communication unit 101, a processor 102, and a memory 103. In the device 10 of FIG. 1, only components related to the embodiment are depicted. Therefore, it is obvious to a person having ordinary skill in the art that other general-purpose components may be included in addition to the components depicted in FIG. 1.

The communication unit 101 may include one or more components enabling wired/wireless communication with an external server or an external device. For example, the communication unit 101 may include a short-range communication unit (not shown) and a mobile communication unit (not shown) for communication with an external server or an external device.

The memory 103 is hardware in which various data processed in the device 10 is stored. The memory 103 may also store programs for processing and controlling the processor 102.

For example, the memory 103 may store various data, such as a video or an image of an object obtained using a first sensor in the sensor unit 120, data obtained using a second sensor in the sensor unit 120, and data generated according to the operation of the processor 102. The memory 103 may also store an operating system (OS) and at least one program (e.g., a program necessary for the processor 12 to operate).

The processor 102 controls the overall operation of device 10. For example, the processor 102 may have overall control over the control unit 100, the sensor unit 120, the display 130, the communication unit 101, the memory (103), and the like by executing programs stored in the memory 103.

The processor 102 may be implemented using at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and other electrical units for performing functions.

The processor 102 may control the operation of at least one of the device 10, the sensor unit 120, and the display 130 by executing programs stored in the memory 103. In an example, the processor 102 may perform at least a portion of a method of obtaining object information using a plurality of sensors described with reference to FIGS. 2 to 9. In another example, the processor 102 may perform at least a portion of a navigation assistance method using fused sensor information described with reference to FIGS. 10 to 14.

The memory 103 may include, for example, random access memory (RAM), such as dynamic random access memory (DRAM) and static random access memory (SRAM), read-only memory (ROM), electrically erasable programmable read-only memory (EEPROM), CD-ROM, Blu-ray or other optical disk storage, a hard disk drive (HDD), a solid state drive (SSD), or flash memory.

The sensor unit 120 may include a plurality of sensors. For example, the sensor unit 120 may include at least one of a radio detection and ranging (Radar) device, an electronic navigational chart (ENC), a light detection and ranging (Lidar) device, an automatic identification system (AIS), a sonar, an inertial measurement unit (IMU), a host ship database (DB). The sensor unit 120 may also include at least one of a sensor configured to capture a video or an image, a sensor configured to detect an object using the Radar device, a sensor using infrared radiation or visible light, a temperature detection sensor, and a motion detection sensor. The plurality of sensors that may be provided on the host ship is not limited thereto. The type of sensors that may be provided on a ship is not limited.

In some embodiments, the sensor unit 120 may include a first sensor and the second sensor. The first sensor may be an image sensor, and the second sensor may be a distance detection sensor. For example, the first sensor may be a sensor that captures still images or moving images and may include at least one of an optical camera, an infrared camera, and an electro-optical/infra-red (EO/IR) camera. The second sensor may be a sensor that detects a distance to an object by transmitting a signal toward the object and may include at least one of a Radar device, a Lidar device, and an AIS.

The display 130 may provide a user with a screen, a monitoring image or an interface. Here, the monitoring image may be an image obtained using an image acquisition device such as the first sensor, a pre-stored image, a real-time image, an electronic navigational chart, a map, or a path guidance image, and the like.

Figure 2:
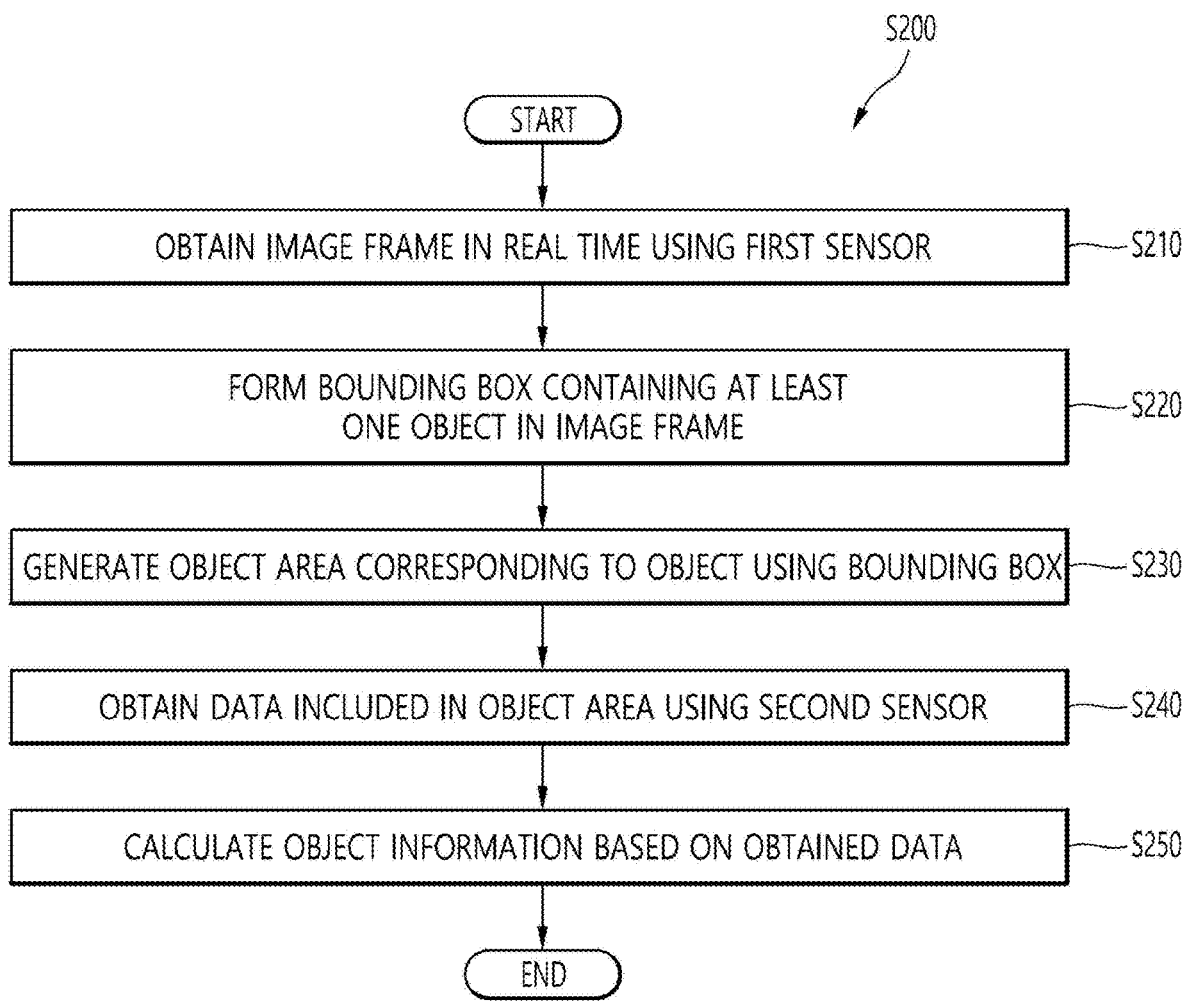
FIG. 2 is a flowchart illustrating an example of a method of obtaining object information using a plurality of sensors according to an embodiment.

FIG. 2 is a flowchart illustrating an example of a method of obtaining object information using a plurality of sensors according to an embodiment.

Hereinafter, a method of obtaining object information by the processor 102 using a plurality of sensors will be briefly described with reference to FIG. 2.

Referring to FIG. 2, a method S200 of obtaining object information using a plurality of sensors may include operations S210 to S250.

In operation S210, the processor 102 may obtain image frames in real time by using the first sensor. In an example, the first sensor may be at least one of an EO camera and an IR camera.

In a case where the first sensor is the EO camera, the processor 102 may obtain real-time image frames using visible light. In a case where the first sensor is the IR camera, the processor 102 may obtain real-time image frames using infrared radiation. Real-time image frames obtained by the processor 102 using at least one of the EO camera and the IR camera may include various objects, such as small ships, large ships, fishing boats, yachts, jet skis, people, buoys, islands, reefs (or rocks), islets, and the like.

In a case where the first sensor includes the EO camera and the IR camera, the processor 102 may use a visible light image frame or an infrared image frame, respectively, or may use both a visible light image frame and an infrared image frame. The processor 102 may generate and use an image frame obtained by fusing respective image frames obtained using the EO camera and the IR camera. Fusing of image frames may include an operation to integrate or combinate multiple image frames. The operation may include comparison and synthesizing of the image frames.

For example, the EO camera may be a camera using visible light. If the EO camera is a camera using visible light, there is a high probability that the EO camera may not capture an object in a dark environment with a high quality. Accordingly, the processor 102 may obtain an object even in a dark environment by fusing respective image frames obtained using both the IR camera and the EO camera. That is, the processor 102 may detect an object and obtain information about the detected object even in a dark environment such as at night.

In operation S220, the processor 102 may form a bounding box containing at least one object in the image frame. The processor 102 may use the bounding box to specify the object included in the obtained image frame. The bounding box may refer to a preset area in a photograph or a visual image detected by artificial intelligence.

In some embodiments, the processor 102 may detect an object using an object specifying model and specify the object by forming the bounding box containing the object. In some embodiments, the processor 102 may distinguish the type of a specified object using the object specifying model. However, the present disclosure is not limited thereto, and the processor 102 may perform at least one or more of object detection, object specification, and object type classification using the object specifying model. The object specifying model may be an artificial intelligence model.

An artificial intelligence model refers to a set of machine learning algorithms using a layered algorithm structure based on a deep neural network in machine learning technology and cognitive science. For example, the artificial intelligence model may include an input layer receiving an input signal or input data from an external source, an output layer outputting an output signal or output data in response to the input data, and at least one hidden layer positioned between the input layer and the output layer to receive a signal from the input layer, extract characteristics from the receive signal, and transmit the same to the output layer. The output layer receives a signal or data from the hidden layer and outputs the same to the outside.

The object specifying model may be trained using at least one of logging data and data generated using a generative artificial intelligence model. Here, the logging data may refer to photographs of the object directly taken by image capturing device and used for the training of the artificial intelligence model. The generative artificial intelligence model may refer to an artificial intelligence model able to generate or apply text, documents, pictures, or images, unlike existing artificial intelligence models each configured to analyze and determine given data. Therefore, data generated using the generative artificial intelligence model may refer to data generated using the generative artificial intelligence model in order to train the object specifying model. Accordingly, by using the generative artificial intelligence model, the processor 102 may obtain object photographs that are typically difficult to acquire or not usually available as logging data and train the object specifying model using the same.

Data for the training of the object specifying model may be data containing various objects without any limitation in type. For example, data for the training of the object specifying model may include, but is not limited to, various objects such as small ships, large ships, boats, yachts, jet skis, buoys, people, reefs, icebergs, and people.

In operation S230, the processor 102 may generate an object area corresponding to the object using the bounding box. Here, the object area may be a two-dimensional area or a three-dimensional area where depth information of the object may be obtained. The depth information of the object in the two-dimensional object area or the three-dimensional object area may indicate information on distance to the object. The processor 102 may obtain the depth information of the object by generating the object area.

In addition, the object area may be an area between the image frame and a virtual plane, generated by projecting the bounding box onto the virtual plane, and a specific embodiment thereof will be described later.

The object area may be generated based on a frame obtained using the first sensor. The object area may be three-dimensional or two-dimensional. As an example, the two-dimensional object area may be in a horizontal plane posing at the same height.

In operation S240, the processor 102 may obtain data included in the object area using the second sensor. The second sensor may include at least one of a Radar device, a Lidar device, and an AIS.

Here, the radio detection and ranging (Radar) device is a sensor configured to detect an object and obtain information about the detected object by irradiating the object with electromagnetic waves and measuring electromagnetic waves reflected after striking the object, and may obtain the information about the object in the form of point data. The light detection and ranging (Lidar) device is a sensor to detect an object and obtain information about the detected object by irradiating the object with a laser beam and measuring the reflected laser beam after striking the object, and may obtain the obtain information about the object in the form of point cloud data. In addition, the automatic identification system (AIS), also referred to as an automatic ship identification system, is a sensor to transmit and receive information about a ship equipped with the AIS, including the position, speed, and direction of the ship.

In operation S250, the processor 102 may calculate the information about the object based on the obtained data using the second sensor.

For example, the data obtained using the second sensor may be data corresponding to the object included in the object area, and the information about the object may be calculated using the same. In an example, the processor 102 may calculate the information about the object using a median value of the point cloud data corresponding to the object included in the object area and obtained using the second sensor. In another example, the processor 102 may calculate the information about the object using position and size data corresponding to the object included in the object area and obtained using the second sensor.

Here, the calculated information about the object may include, but is not limited to, a distance between the host ship and the object, a bearing angle of the object based on the host ship, coordinate values of the object, a speed of the object, a heading angle of the object, and the like.

Hereinafter, the method of obtaining object information by the processor 102 described above with reference to FIG. 2 using a plurality of sensors will be described in detail.

Figure 3:
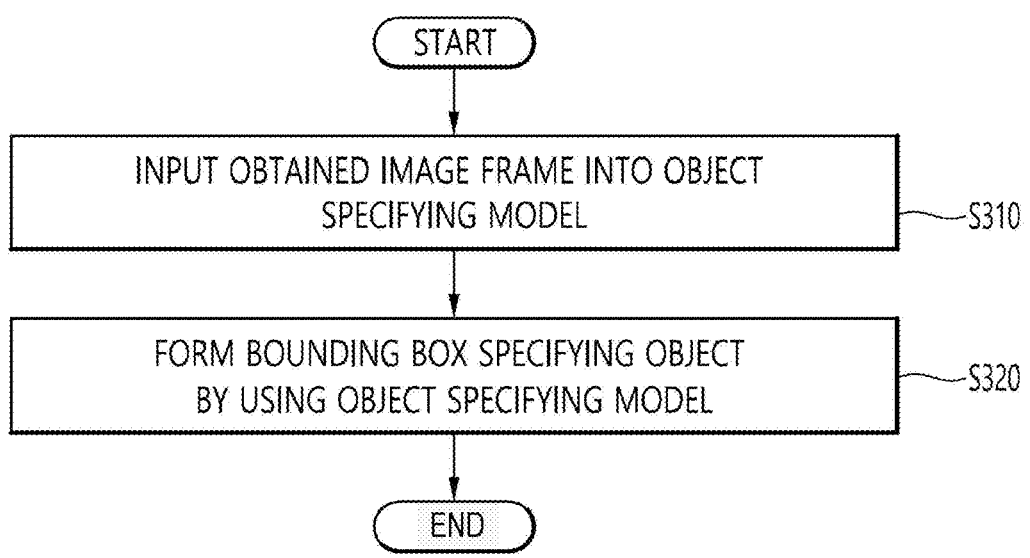
FIG. 3 is a flowchart illustrating an example of a method of detecting an object and specifying the detected object using an object specifying model according to an embodiment.
Figure 4:
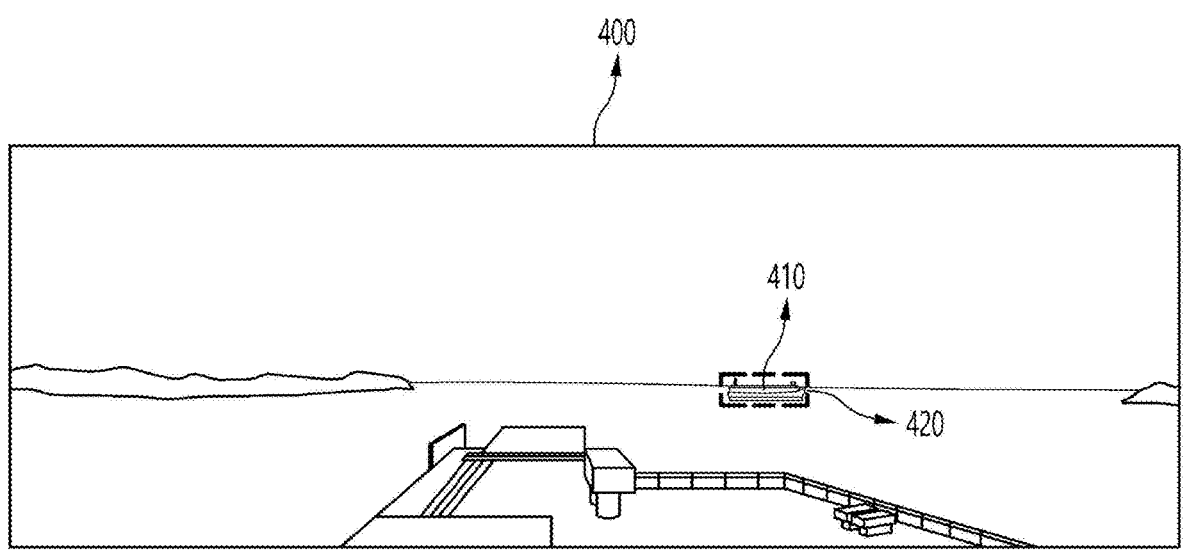
FIG. 4 is a diagram illustrating an example of a method of detecting and specifying at least one object included in an image according to an embodiment.

FIG. 3 is a flowchart illustrating an example of a method of detecting an object and specifying the detected object using an object specifying model according to an embodiment, and FIG. 4 is a diagram illustrating an example of a method of detecting and specifying at least one object included in an image according to an embodiment. FIGS. 3 and 4 may be diagrams explaining operation S220 of FIG. 2 in more detail.

Hereinafter, a method of specifying an object by the processor 102 will be described with reference to FIGS. 3 and 4.

First, referring to FIG. 3, the processor 102 may input an obtained image frame into the object specifying model in operation S310. The processor 102 may use the real-time image obtained using the first sensor as input data of the object specifying model.

In operation S320, the processor 102 may form the bounding box specifying the object by using the object specifying model.

For example, the processor 102 may detect at least one object in the real-time image input to the object specifying model. The processor 102 may obtain information about the position and type of the object in the real-time image by using the object specifying model.

In addition, the processor 102 may mark the detected object by forming at least one bounding box corresponding to the size and number of the detected object by using the trained object specifying model. In other words, the processor 102 may form a large or small bounding box depending on the size of the object by using the artificial intelligence model. In addition, the processor 102 may form the same number of bounding boxes as the number of detected objects by using the artificial intelligence model. Here, the bounding box may refer to a preset area in a photograph or a visual image detected by the artificial intelligence.

In addition, in a case where the number of detected objects is two or more, the processor 102 may specify the two or more objects by forming bounding boxes for each of the two or more objects.

First, in a case where the detected objects do not overlap, the processor 102 may specify one object and another object by forming bounding boxes, respectively. That is, the processor 102 may form each of the bounding boxes for a corresponding object of the plurality of objects detected using the trained object specifying model.

Here, the processor 102 may form each bounding box according to the size of the corresponding object. In other words, the processor 102 may form a large bounding box for an object having a large size and form a small bounding box for an object having a small size.

In addition, even in a case where the detected objects overlap, the processor 102 may form bounding boxes according to the sizes of one object and the other object, respectively. In addition, even in a case where the detected objects completely overlap, with an object in front being entirely contained within an object behind it, the processor 102 may form a bounding box for each object.

Referring to FIG. 4, the processor 102 may specify a detected object 410.

For example, the processor 102 may detect the object 410 included in a real-time image 400 by using the object specifying model. The processor 102 may specify the object 410 by forming a bounding box 420 according to the number and size of the detected object 410. Here, the bounding box 420 in FIG. 4 is shown as a square for convenience of explanation, but the shape of the bounding box is not limited thereto, and may be implemented as a circle, a polygon, or a line corresponding to the shape of the object.

In addition, due to the characteristics of the ship, pitching in which the ship rocks back and forth or rolling in which the ship rocks from side to side may occur during navigation depending on the weather or maritime environment. Therefore, the real-time navigation image (i.e., a series of real time image frames) may happen to include only a portion of the object detected by the processor 102. Or the object may even disappear for a certain period of time (or at least in one frame). However, even in a case where the object is only partially visible or the object disappears and reappears, the processor 102 may track the detected object, thereby identifying the object as the same object.

For example, the processor 102 may track image frames obtained in real time using a tracking algorithm, and determine whether objects included in the frames are the same object based on the correlation between the objects included in the image frames.

Figure 5A:
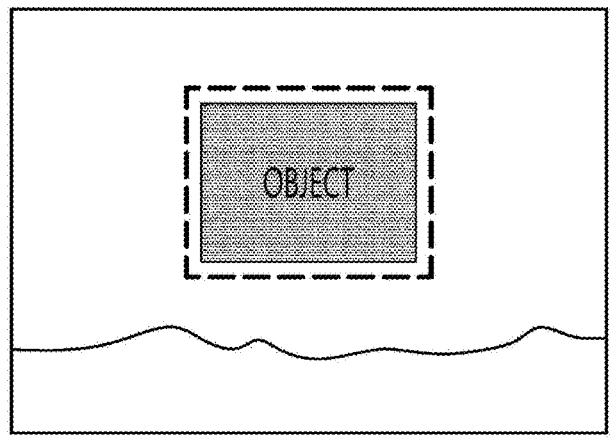
FIGS. 5A to 5C are diagrams illustrating an example of tracking a detected object for respective frames of an obtained image using a tracking algorithm according to an embodiment.
Figure 5B:
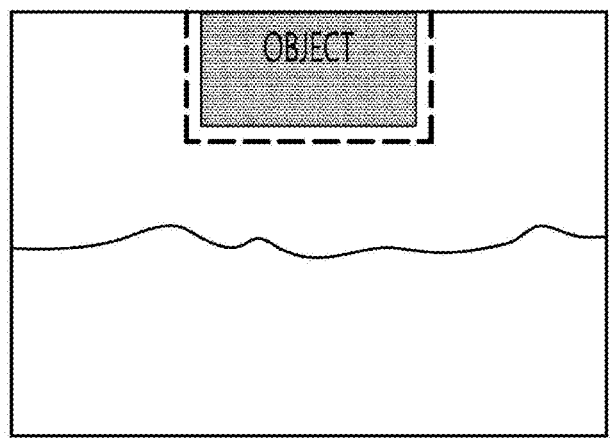
Figure 5C:
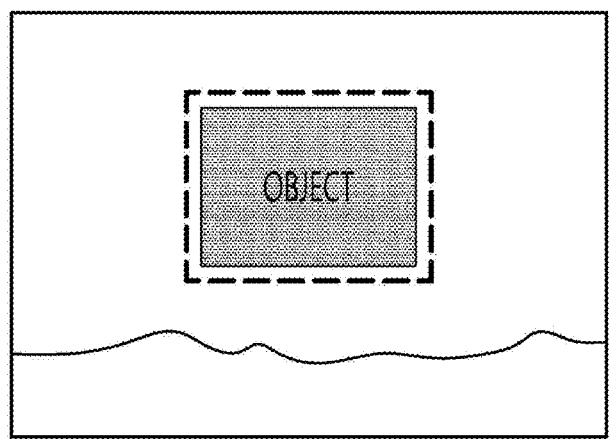

FIGS. 5A to 5C are diagrams illustrating an example of tracking a detected object for respective frames of an obtained image using a tracking algorithm according to an embodiment. Hereinafter, an example in which the processor 102 determines objects included in each frame are the same object by tracking detected objects will be described with reference to FIGS. 5A to 5C.

Referring to FIGS. 5A to 5C, in response to the motion of the ship as described above, the objects may not be included identically in respective frames of the real-time image.

In other words, a first frame 510 may include the entirety of an object, a second frame 520 may include only a portion of the object, and a third frame 530 may include the entirety of the object again. In addition, although not shown in FIGS. 5A to 5C, one frame of a real-time image may include the entirety of an object, while one of the subsequent frames does not include the object at all.

Accordingly, because the processor 102 may track objects for respective frames of the obtained image using the tracking algorithm, even in a case where the second frame 520 includes only a portion of an object or does not include the object at all, the processor 102 may determine all of objects included in the first frame 510, the second frame 520, and the third frame 530 are the same object.

For example, the processor 102 may determine whether the objects tracked for respective frames are the same object based on the association between the objects tracked for respective frames. Specifically, in a case where a feature association value of the objects tracked for respective frames is greater than or equal to a preset value, the processor 102 may determine all of the objects tracked for respective frames are the same object.

Here, the processor 102 may determine that the objects are the same object based on the feature association value of the objects by using at least one of the Kalman filter and the Deep SORT tracking algorithm. For example, even in a case where only a portion or none of the object is included in the second frame 520 due to rolling or pitching of the ship, the processor 102 may determine that the objects detected in the first frame 510 and the third frame 530 are the same object as the object detected in the second frame 520 by using at least one of the Kalman filter and the Deep SORT described above.

Specifically, as described above, the ship may have a large motion due to pitching or rolling, and the detected object may also have a large motion because the detected object is at sea. As a result, respective frames of the navigation image input to the object specifying model may have large differences in information about the objects, even in a case where the objects are the same object. That is, even in a case where the input data input to the object specifying model is consecutive frames, the detected object may be fully visible, only partially visible, or not visible at all, depending on the frame. Accordingly, by using the tracking algorithm, the processor 102 may stably track the detected object by maintaining unity between successive frames.

For example, even in a case where there is no object information in the second frame 520, the processor 102 may track the detected objects for respective frames of the navigation image using the tracking algorithm, and determine whether the respective objects are the same object based on the association relationship (specifically, feature association value) between object information tracked in the first frame 510 and object information tracked in the third frame 530. Accordingly, the processor 102 may specify the detected object by forming a bounding box.

For example, the processor 102 may generate an object area including an object using the formed bounding box. The object area may be an area used to obtain object information. Here, the object area may be a two-dimensional area or a three-dimensional area. In other words, because the original real-time images are flat images where objects are viewed and where the depth of the objects are not depicted, the object area may be used to obtain depth information of the objects included in the image.

FIGS. 6A and 6B are diagrams explaining object areas according to an embodiment. Hereinafter, examples of the object area will be described with reference to FIGS. 6A and 6B.

For example, the processor 102 may generate an object area corresponding to the object using a bounding box.

The object area may be generated based on a frame obtained using the first sensor. The object area may be formed in 3D or 2D.

In a case where the object area is a three-dimensional in 600(a), the processor 102 may generate an object area 610 based on the position of the specified object in the image frame. Here, the three-dimensional object area 610 may be a frustum (i.e., a view frustum), which is intended to describe the field of view of the camera and may have the shape of a cone or a square pyramid from which the horn portion is cut. In other words, the object area 610 may be a hexahedron present between an image frame 620 and a projection surface 630. That is, a screen appearing flat may be illustrated in a three-dimensional manner using the frustum.

For example, the processor 102 may project the object on the projection surface 630 based on the position of object in the image frame 620. Here, a certain shape formed between the image frame 620 and the projection surface 630 may be the object area 610. Here, the object area may be a two-dimensional area or a three-dimensional area where depth information of the object may be obtained.

For example, the processor 102 may project the bounding box specifying an object in the image frame 620 onto the projection surface 630. As a result, the processor 102 may generate a six-sided hexahedron between the image frame

620 and the projection surface 630, and the generated hexahedron may be the object area 610.

Here, the projection surface 630 may mean a virtual plane onto which either an object or a bounding box is projected. The distance between the image frame 620 and the projection surface 630 may be determined based on the type of the second sensor. In other words, in a case where the second sensor is a Radar device or a Lidar device able to obtain three-dimensional object information, a distance at which object information may be obtained using the second sensor is variable depending on the type of the sensor, and thus the distance of the object area at which depth information of the object may be obtained may also be determined according to type of the second sensor.

In addition, in a case where the object area is two-dimensional in 600(*b*), the processor 102 may generate an object area 640 including an object. Here, the two-dimensional object area 640 may be in a top view obtained by viewing the three-dimensional object area 610 from above.

For example, the processor 102 may project the bounding box specifying an object in the image frame 660 onto a virtual plane. However, in a case where the second sensor is an AIS which is able to obtain two-dimensional object information, a distance at which object information may be obtained using the second sensor is not limited, and thus there may be no virtual plane on which the bounding box may be projected. Accordingly, the processor 102 may generate an area a certain length away from the image frame 660 as a two-dimensional object area 640.

In addition, the depth 650 of the two-dimensional object area 640 may be determined based on the length of general ships and environmental information. That is, the length of general ships may be determined by distinguishing between large ships and small ships, and environmental information may be determined by the number of objects around the host ship, topography, the weather environment, the maritime environment, and the like. Accordingly, the processor 102 may determine that the depth 650 of the object area 640 are long in a case where the object is a large ship and short in a case where the object is a small ship. In addition, the processor 102 may determine that the depth 650 of the object area 640 are long in a case where few objects are present around the ship and short in a case where many objects are present around the ship.

Figure 7A:
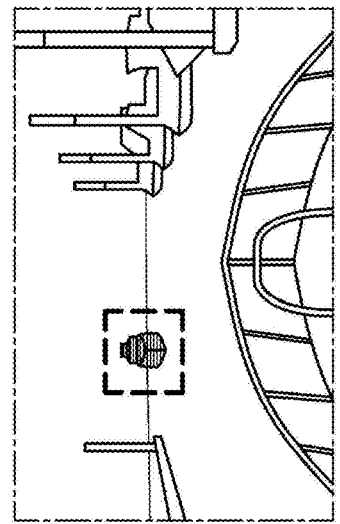
FIGS. 7A to 7C are diagrams illustrating an example of a method of obtaining object information using point data obtained by generating an object area according to an embodiment.
Figure 7B:
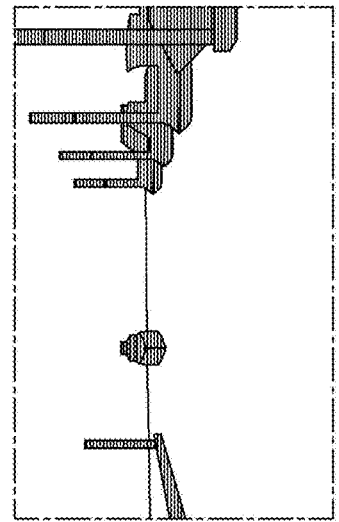
Figure 7C:
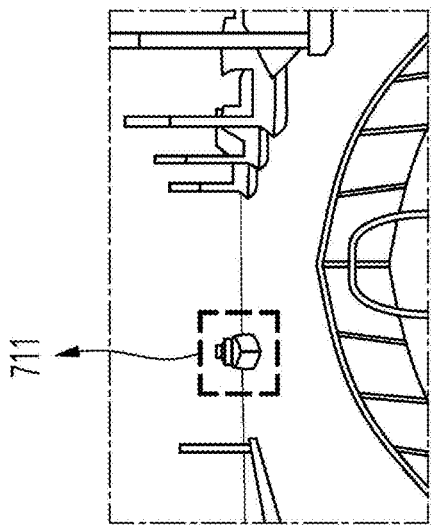

FIGS. 7A to 7C are diagrams illustrating an example of a method of obtaining object information using point data obtained by generating an object area according to an embodiment.

Hereinafter, an example in which the processor 102 obtains point data using the second sensor will be described with reference to FIGS. 7A to 7C. FIGS. 7A to 7C may be diagrams illustrating operation S240 of FIG. 2 in detail.

For example, the processor 102 may detect an object 711 included in an image frame 710 obtained using a first sensor (or an EO camera) and specify the detected object 711 using a bounding box. In addition, the processor 102 may obtain point data of all objects included in the image frame 720 obtained using the second sensor. The point data may include at least one of point cloud data output from the Lidar device and point data output from the Radar device.

In an example, the processor 102 may calculate object information using a median value of point cloud data corresponding to an object included in the object area and obtained using the second sensor. In addition, in a case where a plurality of objects are included in the object area, the processor 102 may calculate object information close to the host ship among the plurality of objects in the object area by using a median value of dominant point cloud data among the point cloud data corresponding to the plurality of objects included in the object area and obtained using the second sensor. Here, the processor 102 may calculate the median value of the point cloud data even in a case where the number of point cloud data is greater than a preset number.

In another example, the processor 102 may calculate object information using a median value of point data corresponding to an object included in the object area and obtained using the second sensor. In addition, in a case where a plurality of objects are included in the object area, the processor 102 may calculate object information close to the host ship among the plurality of objects in the object area by using a median value of dominant point data among point data corresponding to the plurality of objects included in the object area and obtained using the second sensor. Here, the processor 102 may calculate the median value of the point data in a case where the point data is greater than a preset number.

FIGS. 8A and 8B are diagrams illustrating an example of a method of calculating information about a specified object using an object area and data obtained using a second sensor according to an embodiment.

Hereinafter, an example in which the processor 102 calculates object information using point data will be described with reference to FIGS. 8A and 8B.

First, as described above with reference to FIGS. 7A to 7C, similarly in FIGS. 8A and 8B, the point data may include at least one of point cloud data output from the Lidar device and point data output from the Radar device.

For example, in a case where a single object is included in the object area 810(*a*) in 800(*a*), the processor 102 may obtain point data (or point cloud data) 820(*a*) corresponding to the object using the second sensor, as described above with reference to FIGS. 7A to 7C. Here, the point data or point cloud data may be information expressed as a set of points in a three-dimensional space, and generally be expressed as (x, y, z) coordinates. For example, the processor 102 may obtain point data (or point cloud data) 820(*a*) of the object present within the generated object area 810(*a*), i.e., the (x, y, z) coordinates of the object.

Accordingly, the processor 102 may obtain the object information using the obtained point data (or point cloud data) 820(*a*). In an example, the processor 102 may obtain the object information by calculating an average value of all point data (or point cloud data) 820(*a*) of the object. In another example, the processor 102 may obtain the object information by calculating median values of all point data (or point cloud data) 820(*a*).

In addition, in a case where two or more objects are included in the object area 810(*b*) in 800(*b*), the processor 102 may obtain both point data (or point cloud data) 820(*b*) of a first object close to the host ship and point data (or point cloud data) 830(*b*) of a second object further away from the host ship than the first object. However, because a portion of the second object may be hidden by the first object, only a portion of the point data (or point cloud data) 830(*b*) of the second object may be obtained.

In this case, the processor 102 may calculate the object information using more dominant point data (or point cloud data) among the point data (or point cloud data) 820(*b*) of the first object and the point data (or point cloud data) 830(*b*) of the second object. As a result, the processor 102 may determine that the point data (or point cloud data) 820(*b*) of the first object positioned closer to the host ship is more dominant point data (or point cloud data), and may calculate information about the first object.

In addition, in a case where the object area is two-dimensional although not shown in FIGS. 8A and 8B, the processor 102 may calculate the object information using position and size data obtained using the second sensor. In other words, in a case where the object included in the image obtained using the first sensor is determined to correspond to the object area and is equal to the position and size data obtained using the second sensor by a preset value or more, the processor 102 may calculate information about the corresponding object.

Here, the object information may include at least one of a distance and a bearing angle of the object, and may further include a speed. In addition, the processor 102 may provide a monitoring image displaying the object information.

Figure 9:
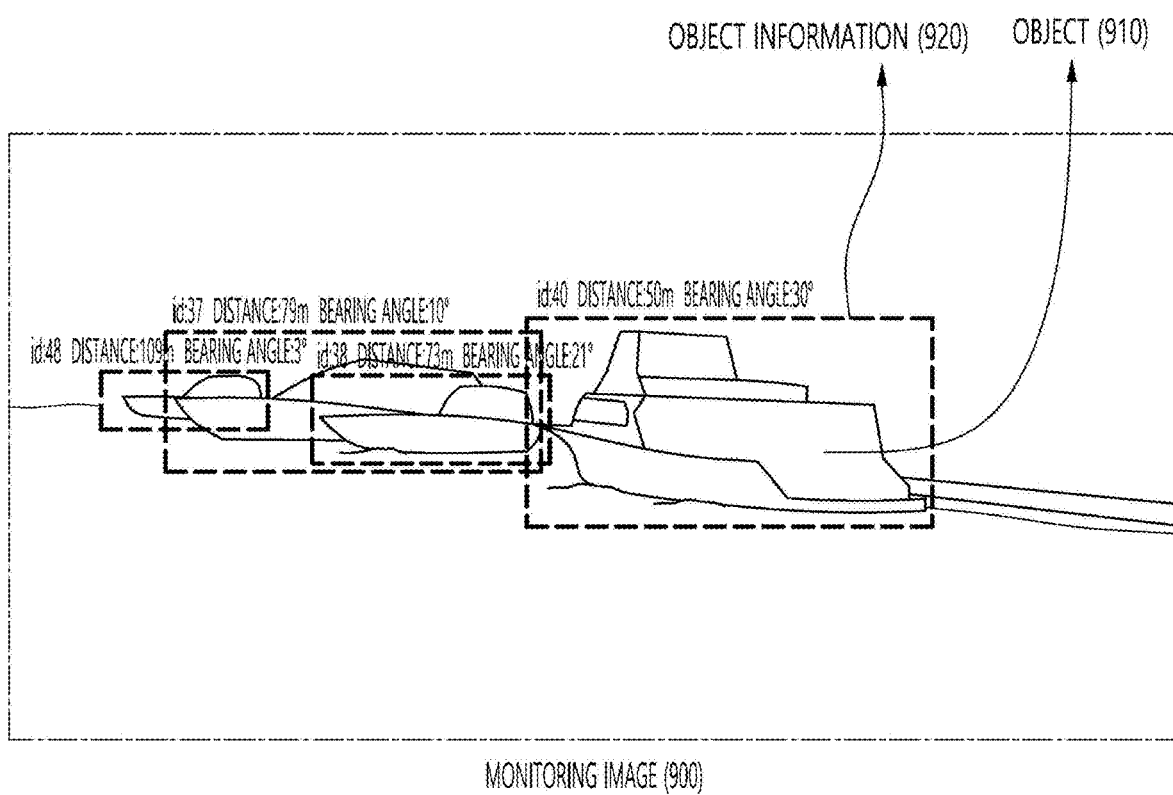
FIG. 9 is a diagram illustrating an example of a monitoring image that displays object information according to an embodiment.

FIG. 9 is a diagram illustrating an example of a monitoring image that displays object information according to an embodiment.

Hereinafter, an example in which the processor 102 provides a monitoring image displaying object information will be described with reference to FIG. 9.

Referring to FIG. 9, the processor 102 may provide a monitoring image 900 displaying a specified object 910 and information 920 about the specified object.

For example, the processor 102 may display object information 920 including a distance between the host ship and the object 910, a bearing angle of the object 910 with respect to the host ship, coordinate values of the object 910, a speed of the object 910, a heading angle of the object 910, and the like. The processor 102 may provide a user with a monitoring image displaying the object information 920.

In addition, only the distance and bearing angle of the object are depicted as the object information 920 in FIG. 9 for ease of explanation, but the processor 102 may provide a monitoring image that also displays information other than the above information.

Figure 10:
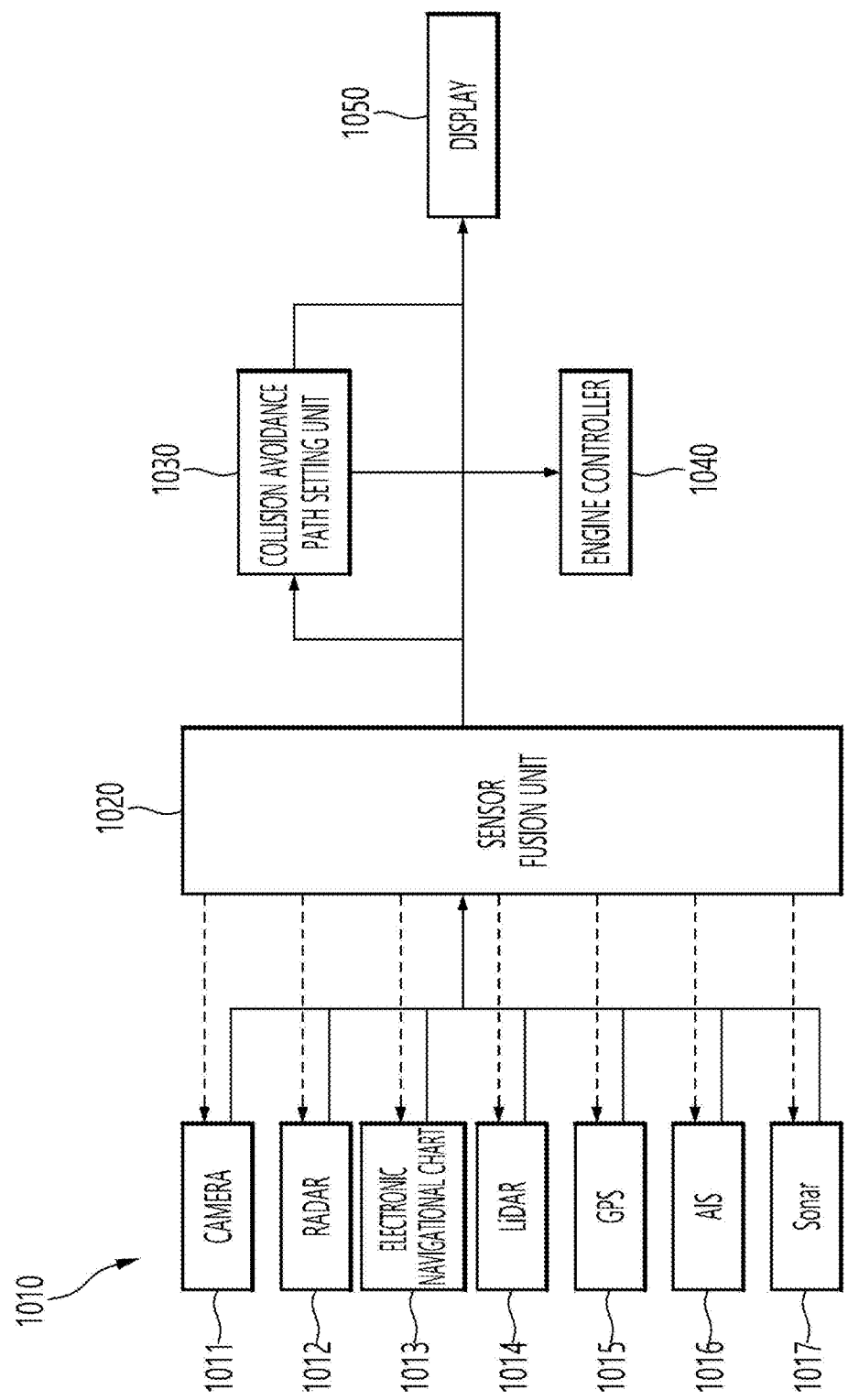
FIG. 10 is a block diagram illustrating an example of a configuration of a navigation assistance device using fused sensor information according to an embodiment.

FIG. 10 is a block diagram illustrating an example of a configuration of a navigation assistance device using fused sensor information according to an embodiment.

As shown in FIG. 10, the navigation assistance device using fused sensor information according to an embodiment may include a sensor unit 1010 provided on a host ship. The sensor unit 1010 may be a plurality of various sensors related to navigation and may include at least a camera 1011, a GPS device 1015, and a sensor fusion unit 1020. The sensor fusion unit 1020 may be configured to check types of a plurality of sensors, integrate sensing information of sensors checked to detect objects, and determine the presence and type of a detected object based on the integrated sensing information. The navigation assistance device may further include a collision avoidance path setting unit 1030 and a display 1050. The collision avoidance path setting unit 1030 may be configured to calculate a collision risk of the host ship by comparing characteristics of the determined object and the host ship and determines an avoidance path according to the calculated collision risk. The display 1050 may be configured to fuse and display the determined avoidance path and the type of the determined object on a real-time screen during navigation.

Figure 11:
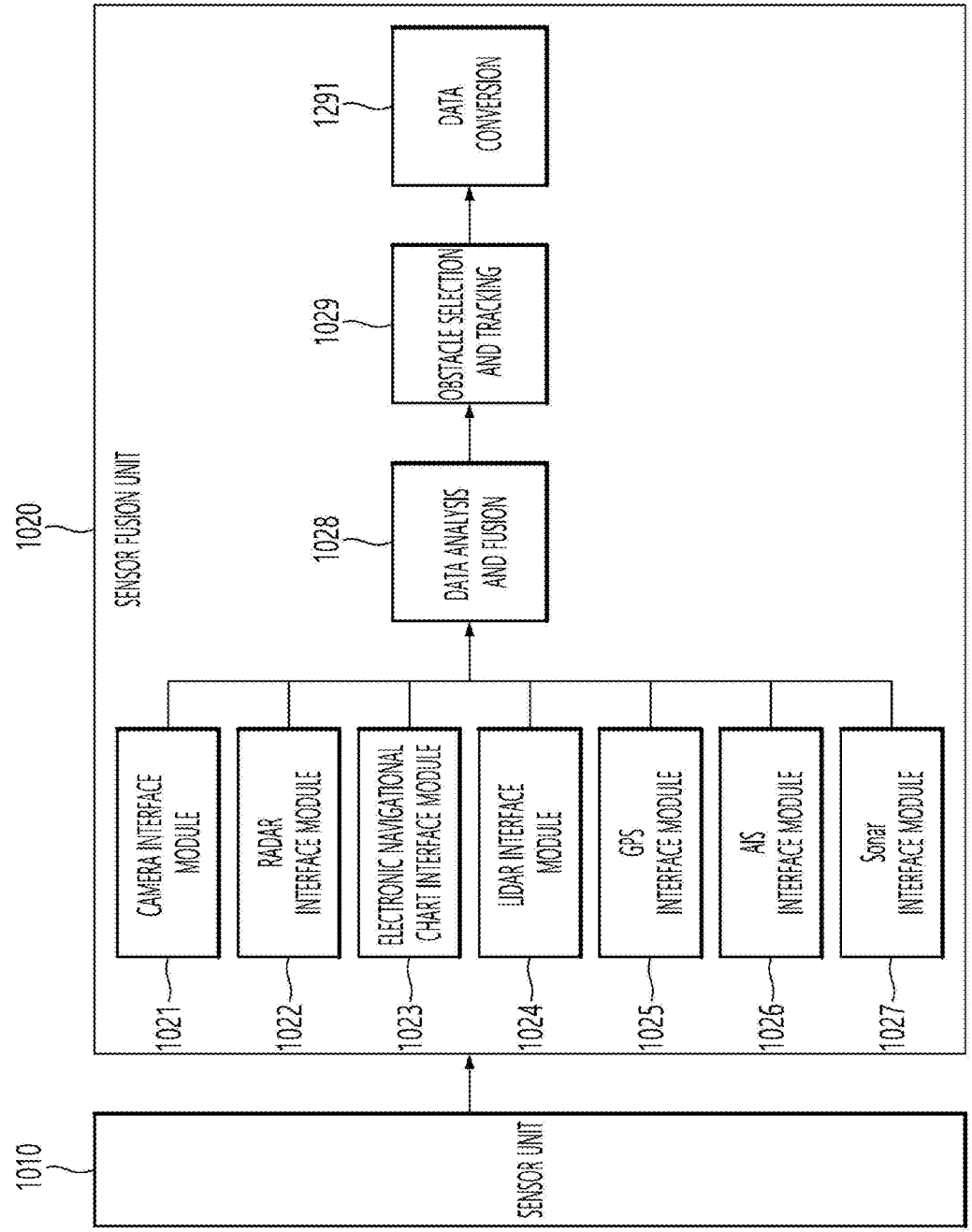
FIG. 11 is a block diagram illustrating an example of a configuration of a fusion sensor unit according to an embodiment.

In addition, the sensor unit 120 in FIG. 1 may refer to the same sensor unit as the sensor unit 1010 in FIGS. 10 and 11, and the display 130 in FIG. 1 may refer to the same display as the display 1050 in FIG. 10.

In addition, an engine controller 140 configured to convert an engine control command of the collision avoidance path setting unit 1030 according to the path set by the collision avoidance path setting unit 1030 and an engine state of the host ship may be further included.

In an embodiment, the sensor fusion unit 1020 may identify types of a plurality of sensors, and may integrate the sensing information of the camera 1011, the GPS device 1015, and sensors checked to be additionally provided in order to detect objects.

The plurality of sensors according to an embodiment of the present disclosure may include at least one of a radio detection and ranging (Radar) device 1012, an electronic navigational chart (ENC) 1013, a light detection and ranging (Lidar) device 1014, an automatic identification system (AIS) 1016, a sonar 1017, an inertial measurement unit (IMU) (not shown), and a proprietary database (DB) (not shown). The plurality of sensors that may be provided on the host ship is not limited thereto, and types of sensors provided on a ship are not limited.

In addition, in the sensor fusion unit 1020 according to an embodiment of the present disclosure, the types of sensors included in a plurality of sensors and usable may be pre-registered, as indicated by dotted lines in FIG. 10. In other words, different sensors may be provided on respective ships, and the sensor fusion unit 1020 may pre-register (e.g., detecting existence of the sensors and establishing the connection) the usable sensors provided on the ship and collect only sensor data from the usable sensors to fuse the sensing information.

For example, in a case where the host ship is a small ship provided with the camera 1011, the Lidar device 1014, and the GPS device 1015, the sensor fusion unit 1020 may obtain an image from the camera 1011, point cloud data from the Lidar device 1014, and a position of the host ship received by the GPS device 1015, detect an object close to the position of the host ship, integrate detections of the same object by the camera 1011 and the Lidar device 1014, and leave detections of different objects.

For example, in a case where the camera 1011 and the Lidar device 1014 detected other ships, respectively, and each of the detected other ships is within a preset certain range, the sensor fusion unit 1020 may determine that the other ships are a single other ship and fuse sensing information together, and the collision avoidance path setting unit 1030 may set an avoidance path to detour the single other ship.

Figure 13:
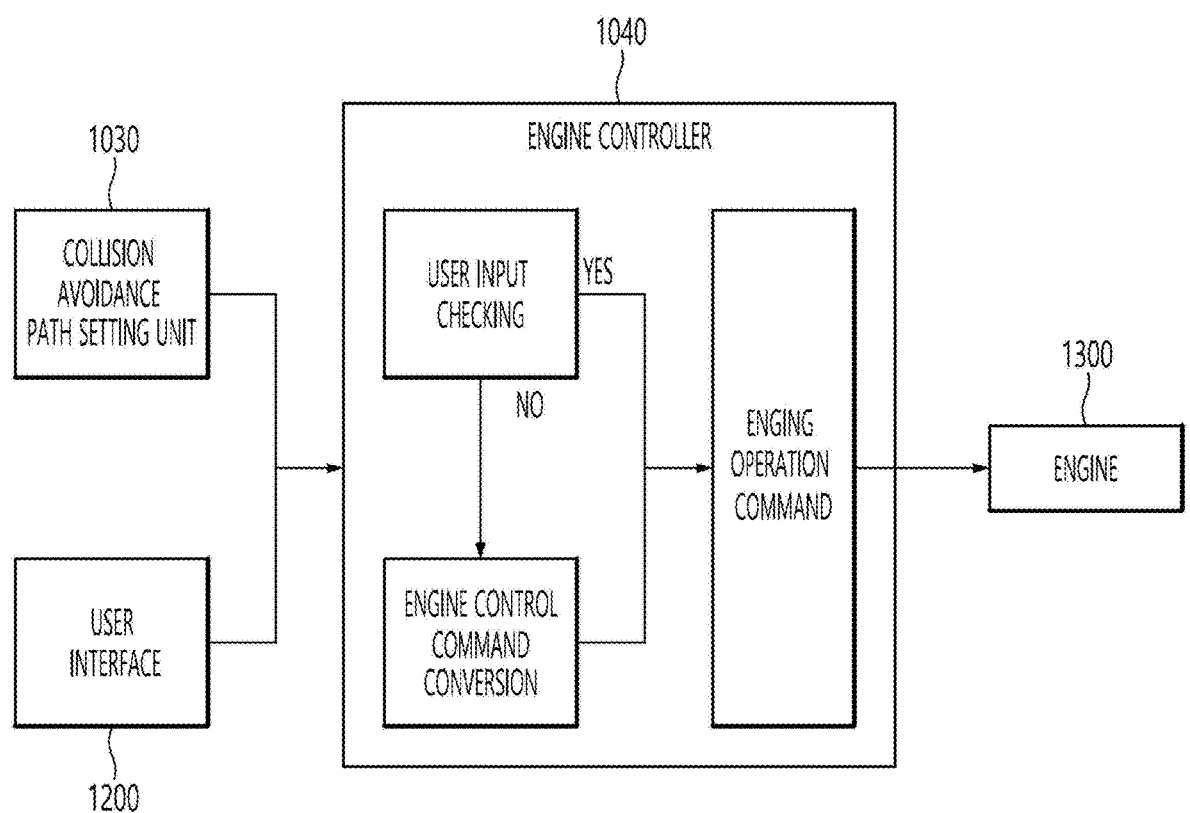
FIG. 13 is a flowchart illustrating an example of a control operation by an engine controller according to an embodiment.

In other words, the camera 1011 and the Lidar device 1014 may detect obstacles including other ships, coastal structures, and the like In an example, in order to pre-register usable sensor types, a user may enter the provided sensors through a separate user interface 1200 (see FIG. 13).

In another embodiment, the sensor fusion unit 1020 may broadcast a message to the sensor unit 1010, receive responses to the message from a plurality of sensors disposed on the sensor unit 1010, and register usable sensors according to the received responses.

Any other methods not listed herein may also be applied, as long as such methods may determine what other sensor types are available.

Accordingly, the sensor fusion unit 1020 may pre-check the types of usable sensors, including the camera 1011 and the GPS device 1015, and obtain sensing information from the checked usable sensors.

The sensor fusion unit 1020 according to an embodiment of the present disclosure may integrate sensing information obtained from the usable sensors using a deep learning-based learning module or a probabilistic inference method.

A single piece of sensing information may be obtained for a single object by applying probabilistic reasoning based on a plurality of sensor data obtained from the usable sensors.

The plurality of sensors may detect objects in unique manners and probabilistically infer whether the detected objects are different objects or the same object, thereby integrating the sensing information.

In addition, among the usable sensors, sensors configured to perform image-based object detection using images may track objects in images obtained from sensors by using a deep learning-based object tracking algorithm.

Specifically, the sensor fusion unit 1020 may determine the position of the host ship from the GPS device 1015 and obtain front object information of the host ship from the image captured by the camera 1011.

In addition, in a case where the usable sensor is the AIS 1016, information about surrounding objects having relevant equipment and present within a set distance from the position of the host ship may be obtained using the AIS 1016. The AIS 1016 is a sensor able to determine the position and motion of a ship, a buoy, and the like provided with the relevant equipment, and information about a moving object provided with the AIS 1016 may be obtained using the AIS 1016.

In a case where the usable sensor is the Radar device 1012, information about fixed and moving objects around the host ship may be obtained using the Radar device 1012.

In a case where the usable sensor is the electronic navigational chart 1013, information about a sea area in the vicinity of the host ship may be obtained from the electronic navigational chart 1013 in order to obtain a group of candidate navigable paths. For example, the electronic navigational chart 1013 includes information about coastlines, contour lines, water depths, navigational signs such as lighthouses and light buoys, and the like, and fixed object information including the marine area as well as the land area may be obtained using the electronic navigational chart 1013.

In a case where the usable sensor is the Lidar device 1014, object information based on point cloud data may be obtained using the Lidar device 1014.

In a case where the usable sensor is the sonar 1017, information about an undersea terrain or underwater obstacles may be obtained using the sonar 1017.

In a case where the usable sensors are an IMU and a host ship DB, at least one of the motion state, maneuverability, and initial path setting information of the host ship may be obtained using the IMU and the host ship DB. The motion state of the host ship may be obtained using the IMU, and the initial path setting information may be obtained from the host ship DB, or the motion state of the host ship may be obtained using the IMU and the control of the host ship may be obtained using the host ship DB to predict the future navigation state according to the current navigation state.

In other words, sensing is performed according to the usable sensor depending on the type of the sensor, and objects may be selected and tracked by comparing the obtained sensing information.

For example, in a case where each of the Radar device 1012 and the AIS 1016 detect an object within a preset certain range, it may be determined that both the Radar device 1012 and the AIS 1016 detected a same object may, and the sensor data may be integrated (i.e., fused).

In addition, in a case where the Radar device 1012 detects an obstacle located on land, it may be determined that the detected object is data unrelated to the navigation of the host ship, and the object information detected by the Radar device 1012 may be integrated with the sensor data of the electronic navigational chart 1013 to be erased. In other words, the object information detected by the Rada device 1012 may be removed or excluded since the object is unrelated to the navigation of the host ship and it is covered by the data of the electronic navigation chart 1013.

In another embodiment, in a case where the sonar 1017 obtains seafloor topography or underwater obstacle information and detects an underwater obstacle, information about the underwater obstacle may be integrated with water obstacle information detected by other sensors to provide information about water or underwater obstacles impeding navigation at once.

In another embodiment, in a case where an object detected by the Lidar device 1014 is unrelated to the navigation of the host ship, information about the detected object may be erased. Through the above-described process, pieces of sensing information may be compared with each other to reduce sensing errors and select information about obstacles related to the navigation.

The sensor fusion unit 1020 may perform probabilistic inference on the sensing information based on the accuracy of an input sensor depending on the type of the sensor, so that accurate sensing information may be output even in a case where the type of the sensor input is different. In the probabilistic inference, uncertainly is expressed as a numerical value of certainty by inferring whether an object is present using a plurality of sensors that perform sensing in different manners rather than a single sensor, and the presence or absence of an object highly likely to be present when sensor data of the sensor unit 1010 are comprehensively considered or the type of the same may be output.

FIG. 11 is a block diagram illustrating an example of a configuration of the fusion sensor unit according to an embodiment.

As shown in FIG. 11, the sensor fusion unit 1020 may obtain sensing information by data analysis and fusion in 1028 by converting sensor data obtained using respective sensors of the sensor unit 1010 through respective interface modules 1021, 1022, 1023, 1024, 1025, 1026, and 1027 and cleaning up duplicate sensor data.

Objects likely to act as obstacles may be selected and tracked in 1029 from the sensing information that has been analyzed and fused in 1028. Instead of simply providing a warning of an object detected by the ship sensor unit 1010 or tracking the object only in the case of a correct selection by the user, the object may be selected by analyzing and fusing the sensor data of the sensor unit 1010 and then continuously tracked.

For example, in a case where the object is a ship, i.e., a moving object, the speed of the ship, the direction of movement of the ship, a point where the ship will overlap with the path of movement of the host ship, and the like may be tracked. The target ship may be tracked based on environmental information such as current wind direction and tidal current by estimating the state of motion according to the movement of the target ship.

The result data of the object selection and tracking may be subjected to data conversion 1291 according to the collision avoidance path setting unit 1030 or the display 1050.

The respective sensor interface modules 1021, 1022, 1023, 1024, 1025, 1026, and 1027, the data analysis and fusion 1028, the object selection and tracking 1029, and the data conversion 1291 may be provided by logically dividing the functions of the sensor fusion unit 1020, and may be implemented integrally in a single computing device or individually in separate units according to the respective logical functions. In other words, each of the sensor interface modules 1021, 1022, 1023, 1024, 1025, 1026, and 1027 may be implemented separately in different ones of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and other electrical units for performing functions, or the sensor interface modules 1021, 1022, 1023, 1024, 1025, 1026, and 1027 may be implemented integrally in a single one of them.

The collision avoidance path setting unit 1030 according to an embodiment of the present disclosure may determine a candidate avoidance path according to the presence and type of the object determined by the sensor fusion unit 1020, determine a final avoidance path by considering the maneuverability of the ship, and generate an engine control command according to the determined final avoidance path.

Figure 12:
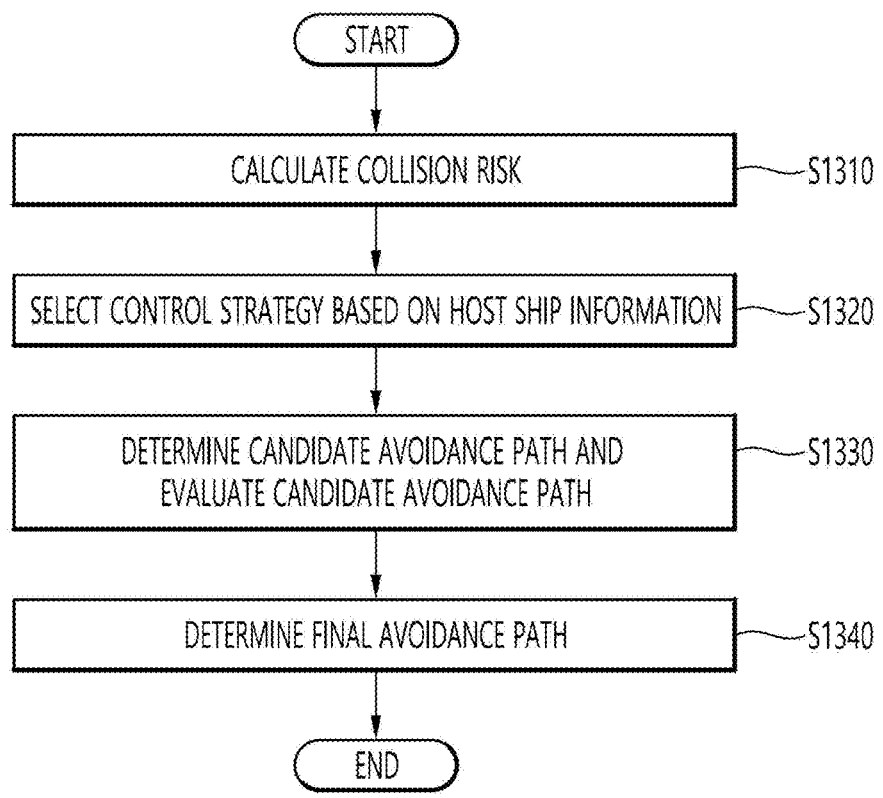
FIG. 12 is a flowchart illustrating an example of a control operation of a collision avoidance path setting unit according to an embodiment.

FIG. 12 is a flowchart illustrating an example of a control operation of the collision avoidance path setting unit according to an embodiment.

Specifically, as shown in FIG. 12, the collision avoidance path setting unit 1030 may calculate a collision risk according to the obtained sensing information in S1310.

The collision risk may be calculated according to the probability-based collision possibility by considering a proximity distance between the host ship and an object, directions of movement, overlapping paths, and the like, according to the object-selected and tracked sensing information.

In addition, a control strategy based on host ship information may be selected according to the calculated collision risk in S1320. For example, in a case where there is a quite high collision risk due to the presence of a marine structure ahead, the host ship may set a detour strategy by setting an avoidance path. In another example, in a case where there is another ship ahead and the other ship is a smaller ship than the host ship, the other ship will detour according to ship safety standards (i.e., the International Regulations for Preventing Collisions at Sea (COLREG)), so a control strategy of not setting a detour path may be set by considering the maneuverability of the host ship.

Thereafter, in a case where the detour strategy is selected, candidate avoidance path determination and candidate avoidance path evaluation may be performed in S1330, and a final avoidance path may be determined in S1340.

For example, in a case where there is a marine structure such as a coral reef near the sea level ahead, a detour path having a longer avoidance distance among a plurality of detour paths may be determined to be the final avoidance path because there is a risk of collision with the bottom of the hull, and in other cases, a shortest detour path may be determined to be the final avoidance path in order to reduce fuel consumption.

In an embodiment, the collision avoidance path setting unit 1030 may consider a plurality of candidate avoidance paths and determine an optimal candidate avoidance path among the plurality of candidate avoidance paths as the final avoidance path. A candidate avoidance path in which the International Regulations for Preventing Collisions at Sea (COLREG) are considered, a candidate avoidance path for consuming minimum fuel cost, and a candidate avoidance path having the highest probability of collision avoidance may be derived according to the navigation situation, and the optimal path may be determined using a plurality of parameters according to the current host ship situation and presented on the display 1050. In other words, collision avoidance paths are set according to a plurality of scenarios, and the optimal avoidance path among the collision avoidance paths may be determined and provided to the user.

Accordingly, in response to the provision of the fused sensing information by the sensor fusion unit 1020, the collision avoidance path setting unit 1030 may calculate the collision risk according to the presence and type of the object and finally determine an avoidance path by considering the calculated collision risk and the maneuverability of the host ship.

The collision avoidance path setting unit 1030 may finally determine the avoidance path by additionally considering the marine environment information obtained by the sensor unit 1010 in the calculation of the collision risk.

In addition, the collision avoidance path setting unit 1030 may generate an engine control command according to the determined final avoidance path. As shown in FIG. 13, the engine controller 1040 that has received the engine control command from the collision avoidance path setting unit 1030 may convert the engine control command of the collision avoidance path setting unit 1030 according to the engine state of the host ship.

Once the collision avoidance path setting unit 1030 determines the final avoidance path, the host ship engine 1300 may be operated by the engine controller 1040 according to the navigation direction for the final avoidance path, speed, and the like.

In other words, in a case where the collision avoidance path setting unit 1030 determines the final avoidance path, the engine 1300 must be controlled to follow the final avoidance path, and the engine controller 1040 may transmit the control command to control the engine 1300.

In addition, the engine controller 1040 may receive the engine control command through the collision avoidance path setting unit 1030 or may receive a user input directly through the user interface 1200.

The user interface 1200 may include a control device that controls the engine, such as a joystick, a steering wheel, or a throttle, and may also include the display 1050 described above.

In a case where the user interface 1200 is the display 1050, the final avoidance path may be displayed and an engine control command may be entered at the same time through the user interface 200.

In a case where the engine controller 1040 receives the user input and the engine control command at the same time by receiving the user input from the user interface 1200 and receiving the engine control command from the collision avoidance path setting unit 1030, the user input may be provided with a higher priority than the control command of the collision avoidance path setting unit 1030 to control the engine.

FIG. 13 is a flowchart illustrating an example of a control operation by the engine controller according to an embodiment.

As shown in FIG. 13, the controller checks whether there is a user input. In a case where there is the user input (YES in FIG. 13), the engine 1300 may be controlled by generating an engine operation command according to the user input. Conversely, a case where there is no user input (NO in FIG. 13), an engine operation command may be generated by converting the engine control command of the collision avoidance path setting unit 1030 to control the engine 1300. That is, in a case where the user makes a decision different from that of the collision avoidance path setting unit 1030 through the display 1050 on which the sensing information of the sensor fusion unit 1020 is displayed, the user selection is provided with a priority to allow the user to access the engine.

At this time, the display 1050 according to an embodiment of the present disclosure may output the data received from the collision avoidance path setting unit 1030 and the sensor fusion unit 1020 as an augmented reality image.

In an example, the detected object may be output in the augmented reality based on the sensor fusion result and the image of the camera 1011 by a separate device configured to output the augmented reality image.

In another embodiment, the data received from the collision avoidance path setting unit 1030 and the sensor fusion unit 1020 may be displayed on a multi-function display (MFD) device mounted on an existing ship.

In addition, the navigation assistance method using fused sensor information according to an embodiment of the present disclosure may be performed by the navigation assistance device using fused sensor information, in which the navigation assistance device includes the sensor unit 1010 of a plurality of sensors related to navigation including at least the camera 1011 and the GPS device 1015.

Figure 14:
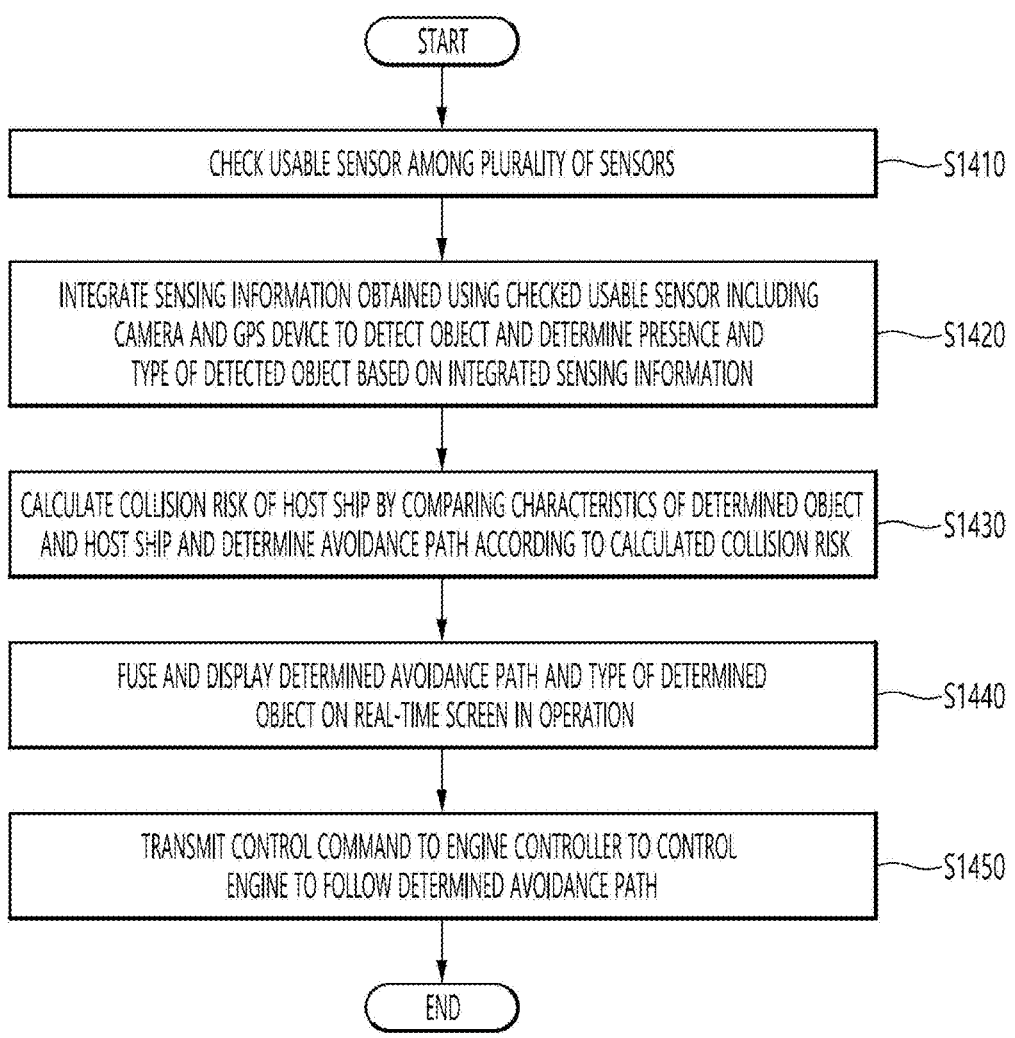
FIG. 14 is a flowchart illustrating an example of a navigation assistance method using fused sensor information according to an embodiment.

FIG. 14 is a flowchart illustrating an example of the navigation assistance method using fused sensor information according to an embodiment.

As shown in FIG. 14, in operation S1410, a processor checks usable sensors from among a plurality of sensors. In operation S1420, the processor integrates sensing information obtained using the checked usable sensors including the camera 1011 and the GPS device 1015 to detect an object and determines the presence and type of the detected object based on the integrated sensing information. In operation S1430, the processor calculates a collision risk of the host ship by comparing the characteristics of the determined object and the host ship and determines an avoidance path according to the calculated collision risk. In operation S1440, the processor fuses and displays the determined avoidance path and the type of the determined object on a real-time screen in operation. Then, in operation S1450, the processor transmits a control command to the engine controller to control the engine 1300 to follow the determined avoidance path.

The plurality of sensors according to an embodiment of the present disclosure may include at least one of an automatic identification system (AIS), a radio detection and ranging (Radar) device, a light detection and ranging (Lidar) device, an inertial measurement unit (IMU), a database (DB), a sonar, and an electronic navigational chart (ENC).

In other words, except for the camera 1011 and the GPS device 1015 provided on all ships, different types of sensors may be provided depending on the type of the ship and the choice of the ship owner, so that usable sensor information may be obtained before the collision avoidance path setting unit 1030 determining a collision avoidance path according to the sensing information of the sensor fusion unit 1020.

The operation S1420 of determining the presence and type of the detected object based on the integrated sensing information according to an embodiment of the present disclosure may include an operation of determining a position of the host ship using the GPS device 1015 and obtaining front object information of the host ship from an image captured by the camera 1011.

In addition, in a case where the usable sensor includes the AIS 1016, information about surrounding objects having relevant equipment and present within a set distance from the position of the host ship may be obtained using the AIS 1016.

In another example, in a case where the usable sensor includes the Radar device 1012, information about fixed and moving objects around the host ship may be obtained using the Radar device 1012.

In another example, in a case where the usable sensor includes the electronic navigational chart 1013, information about the sea area in the vicinity of the host ship may be obtained from the electronic navigational chart 1013 to obtain a group of candidate navigable paths.

In another example, in a case where the usable sensor includes the Lidar device 1014, object information based on point cloud data may be obtained using the Lidar device 1014.

In another example, in a case where the usable sensor includes the sonar 1017, information about the undersea terrain or underwater obstacles may be obtained using the sonar 1017.

In another example, in a case where the usable sensors include the IMU and host ship DB, at least one of the motion state and maneuverability of the host ship and initial path setting information may be obtained using the IMU and host ship DB.

In other words, the above-described operations may be additionally performed depending on the type of the usable sensor, and an operation of selecting and classifying objects by comparing the obtained information may be further included. Features overlapping with the above description will be omitted.

The operation S1430 of determining an avoidance path according to the calculated collision risk according to an embodiment of the present disclosure may further include an operation of generating a plurality of candidate avoidance paths by the collision avoidance path setting unit 1030 and an operation of determining an optimal avoidance path among the generated candidate avoidance paths using a plurality of parameters according to the current ship situation. In other words, the same path is not always determined in the same situation, but the collision avoidance path setting unit 1030 may find and determine a flexible avoidance path according to the current situation of the host ship by considering the plurality of parameters according to the current situation of the host ship.

The display 1050 may present the final avoidance path determined as the optimal avoidance path.

In addition, in another embodiment, in a case where the user does not want to follow the final avoidance path determined by the collision avoidance path setting unit 1030 and presented on the display 1050, the user may enter a user input through the user interface 1200 (see FIG. 13) and control the host ship by manual operation.

In addition, in the operation S1440 of fusing and displaying the determined avoidance path and the determined type of the object on the real-time screen in operation according to an embodiment of the present disclosure, the presence or absence of an object detected based on the integrated sensing information and the determined avoidance path may be received and output as an augmented reality image.

Instead of simply displaying the generated path on the screen, the augmented reality may be used to allow the user to check the sensing information or the generated path while maintaining forward gaze.

In addition, in the operation S1450 of transmitting a control command to the engine controller according to an embodiment of the present disclosure, an engine control command may be generated and transmitted so that a corresponding engine operation is performed to follow the avoidance path determined without separate user input.

In other words, the final avoidance path and detected objects may be displayed on the real-time screen, and at the same time, a corresponding engine control command may be generated and transmitted by the engine controller 1040 to operate the host ship according to the final avoidance path.

In addition, the above-described method may be recorded as a program executable on a computer, and may be implemented in a general-purpose digital computer that runs the program using a computer-readable recording medium. In addition, the data structure used in the above-described method may be recorded on a computer-readable recording medium by various means. The computer-readable recording media includes storage media such as magnetic storage media (e.g., ROM, RAM, USB, floppy disk, hard disk, and the like) and optical read media (e.g., CD-ROM, DVD, and the like).

A person having ordinary skill in the art to which the embodiments of the present disclosure pertain will appreciate that the embodiments may be modified without departing from the essential characteristics of the above description. Also, it is noted that any one feature of an embodiment of the present disclosure described in the specification may be applied to another embodiment of the present disclosure. Similarly, the present invention encompasses any embodiment that combines features of one embodiment and features of another embodiment. Therefore, the above-described methods should be considered in an illustrative rather than a limiting sense, the scope of protection is defined by the appended claims rather than by the foregoing description, and all differences within the scope of equivalents thereof should be construed as being included in the disclosure.

The invention claimed is:

1. A method of obtaining information about an object using a plurality of sensors including a first sensor and a second sensor, the method comprising:
    obtaining an image frame in real time using the first sensor;
    forming a bounding box comprising at least one object within the image frame;
    generating a multi-dimensional object area corresponding to the at least one object using a projection surface to which the bounding box is projected, a projection distance between the image frame and the projection surface being determined according to the second sensor;
    obtaining point data of the at least one object included in the multi-dimensional object area using the second sensor; and
    calculating information about the at least one object based on the obtained point data,
    wherein in a case where the at least one object included in the multi-dimensional object area comprises a plurality of objects, the operation of calculating information about the at least one object comprises:
    obtaining the point data of the plurality of objects using the second sensor; and
    calculating information about an object close to a host ship based on a median value of dominant point data among the point data of the plurality of objects obtained.

2. The method of claim 1, wherein the forming the bounding box comprises:
    inputting the obtained image frame into an object specifying model; and
    forming the bounding box specifying the at least one object by using the object specifying model, wherein the object specifying model is trained using at least one of logging data and a generative artificial intelligence model.

3. The method of claim 1, further comprising:
    tracking image frames obtained in real time by using a tracking algorithm; and
    determining whether objects included in the image frames are a same object based on the association between objects included in the image frames.

4. The method of claim 1, wherein
    the first sensor is a camera, and
    the second sensor is a Lidar device.

5. The method of claim 1, wherein
    the calculating information about the at least one object comprises calculating information about the at least one object based on a median value of the point data obtained using the second sensor.

6. The method of claim 5, wherein the median value of the point data is calculated using a preset number or more of the point data.

7. The method of claim 1, wherein the information of the at least one object comprises at least one of a distance and a bearing angle of the at least one object.

8. The method of claim 7, further comprising at least one of:
    displaying the at least one of the distance and the bearing angle of the at least one object; and
    providing a monitoring image displaying the at least one of the distance and the bearing angle of the at least one object.

9. The method of claim 1, wherein
    the first sensor is at least one of an EO camera and an IR camera, and
    the second sensor is at least one of a Radar device and an automatic identification system (AIS).

10. The method of claim 9, wherein the obtained image frame is an image obtained by fusing individual images obtained using the EO camera and the IR camera.

11. The method of claim 9, wherein the point data obtained using the second sensor is fused data of point data obtained using the Radar device and object data obtained using the AIS.

12. The method of claim 11, further comprising
    providing a monitoring image displaying at least one of a distance, bearing angle, and speed of the at least one object using the fused data.

13. The method of claim 1, wherein a depth of the multi-dimensional object area is determined based on at least one of a type of the at least one object, and environmental information.

14. The method of claim 1, wherein a depth of the multi-dimensional object area is determined based on a type of the second sensor.

15. A navigation assistance system using a plurality of sensors, comprising:
    a display configured to provide a monitoring image;
    a sensor unit comprising the plurality of sensors including a first sensor and a second sensor;
    a memory in which at least one program is stored; and
    at least one processor configured to execute the at least one program,
    wherein the at least one processor is configured to
    obtain image frame information of at least one object using the first sensor,
    form a bounding box comprising the at least one object within the image frame, generate a multi-dimensional object area corresponding to the at least one object using a projection surface to which the bounding box is projected, a projection distance between the image frame and the projection surface being determined according to the second sensor, calculate information about the at least one object obtained using the second sensor from the multi-dimensional object area, calculate a risk of collision between a host ship and the at least one object by fusing the image frame information of the at least one object and the information about the at least one object, and determine an avoidance path based on the calculated collision risk, wherein in a case where the at least one object included in the multi-dimensional object area comprises a plurality of objects, the processor is further configured, in the calculating information about the at least one object, to:

obtain point data of the plurality of objects using the second sensor; and calculate information about an object close to a host ship based on a median value of dominant point data among the point data of the plurality of objects obtained.

16. A method of obtaining information about an object using a plurality of sensors including a first sensor and a second sensor, the method comprising:

obtaining an image frame in real time using the first sensor;

forming a bounding box comprising at least one object within the image frame;

generating a multi-dimensional object area corresponding to the at least one object using a projection surface to which the bounding box is projected, a projection distance between the image frame and the projection surface being determined according to the second sensor;

obtaining point data of the at least one object included in the multiple-dimensional object area using the second sensor; and calculating information about the at least one object based on the obtained point data, wherein, when the at least one object is identified as a ship, a depth of the multi-dimensional object area is determined based on a length of the ship.

* * * * *